US007742380B2

(12) United States Patent
Usami

(10) Patent No.: US 7,742,380 B2
(45) Date of Patent: Jun. 22, 2010

(54) OPTICAL RECORDING METHOD, OPTICAL RECORDING APPARATUS AND OPTICAL RECORDING MEDIUM

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 362 days.

(21) Appl. No.: 11/917,203

(22) PCT Filed: Jun. 19, 2006

(86) PCT No.: PCT/JP2006/312265
§ 371 (c)(1),
(2), (4) Date: Dec. 12, 2007

(87) PCT Pub. No.: WO2006/137367
PCT Pub. Date: Dec. 28, 2006

(65) Prior Publication Data
US 2009/0086604 A1   Apr. 2, 2009

(30) Foreign Application Priority Data
Jun. 22, 2005   (JP) ............................. 2005-182698

(51) Int. Cl.
G11B 7/00 (2006.01)
(52) U.S. Cl. .................................... 369/103; 369/44.11
(58) Field of Classification Search .................. None
See application file for complete search history.

(56) References Cited

U.S. PATENT DOCUMENTS

2003/0090969 A1*  5/2003  Matsumoto et al. ...... 369/44.34
2005/0111335 A1*  5/2005  Kasazumi et al. ........... 369/103
2007/0047419 A1*  3/2007  Usami ........................ 369/103
2007/0047421 A1*  3/2007  Usami ........................ 369/103

FOREIGN PATENT DOCUMENTS

| EP | 1596376 | 11/2005 |
|---|---|---|
| JP | 03-120625 A | 5/1991 |
| JP | 2003-151143 A | 5/2003 |
| JP | 2003-178456 A | 6/2003 |
| JP | 2003-228875 A | 8/2003 |
| JP | 2004-335010 A | 11/2004 |
| JP | 2005-078691 A | 3/2005 |
| WO | 2004-070714 | 8/2004 |

OTHER PUBLICATIONS

Extended European Search Report dated Oct. 24, 2008.

* cited by examiner

Primary Examiner—Joseph H Feild
Assistant Examiner—Joseph Haley
(74) Attorney, Agent, or Firm—Sughrue Mion, PLLC

(57) ABSTRACT

To provide an optical recording method, optical recording apparatus and optical recording medium, capable of effective control of light irradiation position, such as focusing control or tracking control, at the time of recording or reproducing and efficiently adjusting the light irradiation position control according to variations in distance between layers in an optical recording medium or according to manufacturing errors in optical recording and reproducing apparatus, the method including applying at least one of an information light and a reference light to an optical recording medium for detection and control of focus positions of the information light and reference light in a thickness direction of the optical recording medium; and applying the information light and reference light to form an interference image to be recorded in a recording layer provided in the optical recording medium, wherein information is recorded in the recording layer by holography.

9 Claims, 7 Drawing Sheets

OPTICAL RECORDING METHOD, OPTICAL RECORDING APPARATUS AND OPTICAL RECORDING MEDIUM

FIELD OF THE INVENTION

The present invention relates to an optical recording method for recording information by holography, an optical recording apparatus and an optical recording medium. More specifically, the present invention relates to an optical recording method, optical recording apparatus and optical recording medium, which are capable of effective control of light irradiation position, such as focusing control or tracking control, at the time of recording or reproducing and of efficiently adjusting the light irradiation position control according to variations in distance between layers such as a recording layer in an optical recording medium or according to manufacturing errors in optical recording and reproducing apparatus.

DESCRIPTION OF THE RELATED ART

An optical recording method for recording information on an optical recording medium by holography generally involves interference of an information light (object light) having image information with a reference light in an optical recording medium to record a resultant interference fringe on the optical recording medium. An example of such an optical recording method is a collinear strategy in which an information light and reference light are applied in a manner that an optical axis of the information light and an optical axis of the reference light are collinearly aligned. In this collinear strategy an interference fringe is formed as a result of interference between the information light and the reference light, image information or the like are recorded in a recording layer. The recorded information is reproduced by applying the reference light identical to that for recording from the same direction on the optical recording medium to thereby produce diffracted light from the interference fringe and by receiving the diffracted light.

Upon recording or reproducing the image information or the like, controls of light focus positions (e.g., focusing and tracking controls) are carried out for recording/reproducing information on/from a proper position of the optical recording medium, by adjusting thickness variations in layers such as a recording layer in the optical recording medium and/or variations in recording accuracy of the optical recording apparatus.

As a method for controlling focus positions, for example, a sampled servo method is available. In the sampled servo method, a servo light is applied on an optical recording medium for focusing and tracking control, and a reflected light is utilized to detect information of position such as focusing information and/or tracking information for proper light irradiation. This method for controlling focus positions allows application of the information light and the reference light on the exact position on the optical recording medium, thereby recording or reproducing information (see Patent Literatures 1 to 3).

However, on the method for controlling focus positions, the detection is targeted only to the information of the position (e.g., the focusing information and the tracking information) of the servo light irradiation, and the position to which the information light and the reference light is applied in the recording layer is not an object to be detected. Therefore, when there is unevenness in the thickness of layers such as the recording layer or the position of the laminated layers in the thickness direction in the optical recording medium, or when an error in the radiation of the optical recording and reproducing apparatus is occurred together with the error of the recording layer due to the unevenness of the thickness or layer positioning, the recording cannot be performed on the exact position even though the radiation position on the optical recording medium is controlled in advance. Especially when the recording layer is laminated with plural layers, as shown in FIG. 1, a production error is occurred between the designed distance Lw set in an optical recording medium and the distance Mw of the actual optical recording medium, where the distance Lw is a designed distance from a surface of a first substrate 5 to the selective reflection layer which reflects the information light and the reference light in the optical recording medium, and the distance Mw is a distance from a surface of the actual optical recording medium to the selective reflection layer. Similarly, an error is occurred between the designed distance Lg set in the optical recording medium and the distance Mg in the actual optical recording medium, where the distance Lg is a designed distance from the surface of the first substrate 5 to a surface of the reflective layer, which reflects the servo light, and the distance Mg is a distance from a surface of the actual optical recording medium to the selective reflection layer.

Therefore, in the same optical recording and reproducing apparatus, even if the recording and reproducing can be properly performed on one optical recording medium, the reproducing may not be properly performed on another optical recording medium, and thus there is a problem in compatibility, such that the adjustment of the optical recording and reproducing apparatus is required. Since there is a limitation in reducing an error, such as unevenness of the layer thickness, during the manufacturing process, the manufacturing cost may be increased as a result of seeking such the highly accurate optical recording medium.

When recording is performed on such a good quality optical recording medium having no or only a little error, the detection of the focusing information, and the focusing control are generally performed only at the beginning, and once good quality of the optical recording medium is confirmed, the detection of the focusing information, and the focusing control are stopped. Thereafter, the address information, which is detectable even when a relatively large error exits, is detected, and then recording is performed based on the detected information. Therefore, the recording is properly performed with an accelerated recording speed.

When recording is performed on an optical recording medium having a large error, it is necessary to perform the detection of the focus information and focusing control per recording layer or recording region, or every recording, not only at the beginning, and thus the recording speed and recording efficiency are lowered.

Therefore, an excellent optical recording method, optical recording apparatus and optical recording medium have not yet been provided, which are capable of effective control of light irradiation position, such as focusing control or tracking control, at the time of recording or reproducing and of efficiently adjusting the light irradiation position control according to variations in distance between layers such as a recording layer in an optical recording medium or according to manufacturing errors in optical recording and reproducing apparatus. Accordingly, the current situation is that there is a strong demand for them.

Patent Literature 1: Japanese Patent Application Laid-Open (JP-A) No. 2003-151143

Patent Literature 2: Japanese Patent Application Laid-Open (JP-A) No. 2003-178456

Patent Literature 3: Japanese Patent Application Laid-Open (JP-A) No. 2003-228875

DISCLOSURE OF INVENTION

An object of the present invention is to solve the above-mentioned conventional problems, and to achieve the following object. It is an object of the present invention to provide an optical recording method, optical recording apparatus and optical recording medium, which are capable of effective control of light irradiation position, such as focusing control or tracking control, at the time of recording or reproducing and of efficiently adjusting the light irradiation position control according to variations in distance between layers such as a recording layer in an optical recording medium or according to manufacturing errors in optical recording and reproducing apparatus.

The means for solving the above-mentioned problems is as follows:

<1> An optical recording method including (i) applying at least one of an information light and a reference light to an optical recording medium for detection and control of focus positions of the information light and reference light in a thickness direction of the optical recording medium; and (ii) applying the information light and reference light so as to form an interference image to be recorded in a recording layer provided in the optical recording medium, wherein information is recorded in the recording layer by holography.

The optical recording method according to <1> includes the step (i) of applying at least one of the information light and reference light to the optical recording medium containing the recording layer for recording information by holography, for detection and control of the focus positions of the information light and reference light in the thickness direction of the optical recording medium, and the step (ii) of applying the information light and reference light so as to form the interference image to be recorded in the recording layer; therefore, the focus position is detected and controlled separately from the detection of the focus position of a servo light in the thickness direction of the optical recording medium, and then recording is appropriately performed in a position to be recorded in the recording layer.

<2> The optical recording method according to <1>, wherein in the step (i), the focus positions are detected by at least one of an astigmatism method, a Foucault method, and a critical angle method.

In the optical recording method according to <2>, the focusing control is preferably performed when the focus positions are detected by at least one of the astigmatism method, the Foucault method, and the critical angle method in the step (i).

<3> The optical recording method according to any one of <1> and <2>, further including (iii) applying at least a servo light for detection and control of each of focus positions of the servo light.

In the optical recording method according to <3>, the step (iii) of applying at least a servo light and detecting and controlling each of focus positions of the servo light is further included, and then focusing control and tracking control are performed by applying the servo light separately from the step (i), and tracking information and address information are appropriately detected by a servo mechanism of the servo light.

<4> The optical recording method according to <3>, wherein in the step (iii), the focus position in the surface direction is detected by at least one of a three-beam method, a push-pull method, and a differential phase detection method.

In the optical recording method according to <4>, the tracking control is preferably performed when the focus position is detected by at least one of the three-beam method, the push-pull method, and the differential phase detection method in the step (iii).

<5> The optical recording method according to any one of <1> to <4>, wherein the focus position of the servo light is controlled on the basis of information on the focus positions of the information light and reference light, the information detected in the step (i).

<6> The optical recording method according to any one of <1> to <5>, wherein a focal distance detected in the step (i) is defined as "Fr," and a focal distance in the thickness direction of the optical recording medium detected in the step (iii) is defined as "Fs" followed by detection of values for "Fr" and "Fs" at "n" positions, and a difference in focal distance (Fs−Fr) at each of the "n" positions is defined as "ΔF," when a difference between maximum and minimum values of ΔF is within 10 μm, an average value of ΔF for the "n" positions (ΔFa) is calculated, and the servo light is applied so that a sum of the value of ΔFa and an average value of Fr at the "n" positions (Fra), ΔFa+Fra, is equal to a focal distance of the servo light in the thickness direction of the optical recording medium, to thereby omit detection and control of the focus position in the thickness direction of the optical recording medium in the step (iii), and when the difference between the maximum and minimum values of ΔF is more than 10 μm, detection and control of the focus position in the thickness direction of the optical recording medium in the step (iii) is conducted.

In the optical recording method according to <6>, the focus position of the servo light is controlled by adding a difference in focal distance between a predetermined servo light and the information and reference light to a focal distance obtained from focus positions of the information light and reference light detected in the step (i), and thus focusing control of the servo light is not necessarily performed separately, and recording efficiency is improved.

<7> The optical recording method according to any one of <1> to <6>, wherein the optical recording medium is a reflective holographic recording medium.

<8> The optical recording method according to any one of <1> to <7>, wherein the information light and reference light are applied in a manner that an optical axis of the information light and an optical axis of the reference light are collinearly aligned.

<9> The optical recording method according to any one of <1> to <8>, wherein the optical recording medium includes, in order, a first substrate, a recording layer, a filter layer and a second substrate.

<10> The optical recording method according to <9>, wherein the filter layer includes a colored material-containing layer which contains at least one of a pigment and dye.

<11> The optical recording method according to <9>, the filter layer includes a colored material-containing layer which contains at least one of a pigment and dye, and a cholesteric liquid crystal layer disposed on the colored material-containing layer.

<12> The optical recording method according to any one of <10> and <11>, wherein the colored material is a red pigment.

<13> The optical recording method according to <12>, wherein the red pigment having a light transmittance at a wavelength of 532 nm is 33% or less, and the red pigment having a light transmittance at a wavelength of 655 nm is 66% or more.

<14> The optical recording method according to any one of <9> to <13>, wherein the filter layer contains a dielectric material-deposited layer disposed on the colored material-containing layer.

<15> The optical recording method according to any one of <10> to <14>, wherein the colored material-containing layer contains a binder resin which is a polyvinyl alcohol resin.

<16> The optical recording method according to any one of <10> to <15>, wherein the surface of the colored material-containing layer has been subjected to rubbing treatment.

<17> The optical recording method according to any one of <9> to <16>, wherein the filter layer contains the dielectric material-deposited layer which is a laminate of plural dielectric films each having different refractive indices.

<18> The optical recording method according to any one of <14> to <17>, wherein the dielectric material-deposited layer is a laminate of plural layers wherein a dielectric film having a high refractive index and a dielectric film having a low refractive index are alternately disposed.

<19> The optical recording method according to any one of <14> to <18>, wherein the dielectric material-deposited layer is a laminate of 2 to 20 dielectric films.

<20> The optical recording method according to any one of <9> to <19>, wherein the filter layer contains a single cholesteric liquid crystal layer.

<21> The optical recording method according to any one of <9> to <20>, wherein the filter layer is a laminate of two or more cholesteric liquid crystal layers.

The optical recording method according to <21>, wherein two or more cholesteric liquid crystal layers are disposed, the shift in the selective reflection wavelength is not caused, even when an angle of incidence is changed, the information light and reference light and further a reproduction light used upon recording or reproducing do not reach a reflective film. Thus, it is possible to prevent occurrence of diffuse light caused by diffuse reflection on a reflective surface. Therefore, noise caused by the diffuse light is superimposed on a reproduced image and not detected by a CMOS sensor or on CCD, and then the reproduced image can be detected at least to such an extent that errors can be corrected. The greater amount of a noise component by diffuse light requires greater multiplicity of the hologram. That is, the greater the multiplicity is, the smaller the diffraction efficiency is, e.g., when the multiplicity is 10 or more, a diffraction efficiency from one hologram is extremely small. When diffused noise is caused, it is extremely difficult to detect a reproduced image. This configuration makes it possible to eliminate these difficulties and can realize the high density image recording which has not been achieved conventionally.

<22> The optical recording method according to <11> to <21>, wherein the selective reflection wavelength bands of the cholesteric liquid crystal layers form a continuous selective reflection wavelength band.

In the optical recording method according to <22>, each of the cholesteric liquid crystal layer has circularly-polarized-light-separating property, the same rotation direction of the helix, different selective reflection center wavelengths, and the selective reflection wavelength band therein is continuous, thus, the cholesteric liquid crystal layer can eliminate angle dependency of reflection of irradiation light, without causing shift in selective reflection wavelength even when an angle of incidence is changed, and can be suitably used as a wavelength selecting reflective film.

<23> The optical recording method according to any one of <9> to <22>, wherein the filter layer contains the single cholesteric liquid crystal layer which contains at least a nematic liquid crystal compound and a photoreactive chiral compound.

<24> The optical recording method according to any one of <11> to <23>, wherein the cholesteric liquid crystal layer has circularly-polarized-light-separating property.

<25> The optical recording method according to any one of <11> to <24>, wherein the cholesteric liquid crystal layers have the same rotation direction of the helix.

<26> The optical recording method according to any one of <11> to <25>, wherein the cholesteric liquid crystal layers have different selective reflection center wavelengths.

<27> The optical recording method according to any one of <11> to <26>, wherein the cholesteric liquid crystal layers have selective reflection wavelength band width of 100 nm or more.

<28> The optical recording method according to any one of <9> to <27>, wherein a first light passes through the filter layer while a second light which is different in wavelength from the first light is reflected.

<29> The optical recording method according to any one of <9> to <28>, wherein a first light passes through the filter layer while a second light which is in wavelength different from the first light is reflected.

<30> The optical recording method according to any one of <28> and <29>, wherein the first light has a wavelength of 350 nm to 600 nm, and the second light has a wavelength of 600 nm to 900 nm.

<31> The optical recording method according to any one of <9> to <30>, a transmittance of the light having a wavelength of 655 nm is 50% or more and a transmittance of the light having a wavelength of 532 nm is 30% or more at an angle within ±40° in the filter layer <32> The optical recording method according to any one of <9> to <31>, the transmittance of the light having a wavelength of 655 nm is 50% or more and the transmittance of the light having a wavelength of 532 nm is 30% or more at an angle of incidence within ±40°.

<33> The optical recording method according to any one of <9> to <32>, wherein the filter layer has a light reflectance of 40% or more for a light having a wavelength range of $\lambda_0$ to $\lambda_0/\cos 20°$, where $\lambda_0$ represents a wavelength of irradiation light.

<34> The optical recording method according to any one of <9> to <33>, wherein the filter layer has a light reflectance of 40% or more for a light having a wavelength range of $\lambda_0$ to $\lambda_0/\cos 40°$, where $\lambda_0$ represents a wavelength of irradiation light.

<35> The optical recording method according to any one of <9> to <34>, wherein the filter layer is used as a selective reflection film of the optical recording medium for recording information by holography.

<36> The optical recording method according to any one of <9> to <35>, wherein the filter layer contains the photoreactive chiral compound which contains a chiral site and a photoreactive group, and the chiral site is at least one selected from an isosorbide compound, an isomannide compound and a binaphthal compound.

<37> The optical recording method according to <36>, wherein the photoreactive group is a group which induces trans-to-cis isomerization about a carbon-carbon double bond by light irradiation.

<38> The optical recording method according to any one of <7> to <37>, wherein the substrate has a servo pit pattern.

<39> The optical recording method according to any one of <35> to <38>, wherein the servo pit pattern has a reflective film on a surface thereof.

<40> The optical recording method according to any one of <35> to <39>, wherein the reflective film is a metallic reflective film.

<41> The optical recording method according to any one of <9> to <40>, further containing a first gap layer for smoothening a surface of the second substrate between the filter layer and the reflective film.

<42> The optical recording method according to any one of <1> to <41>, further containing a second gap layer between the recording layer and the filter layer.

<43> The optical recording method according to any one of <9> to <42>, wherein the optical recording medium is a reflective holographic recording medium.

<44> An optical recording apparatus including a record focus position controlling unit configured to apply at least one of an information light and a reference light to an optical recording medium for detection and control of focus positions of the information light and reference light in a thickness direction of the optical recording medium, and an interference image recording unit configured to apply the information light and reference light so as to form an interference image to be recorded in a recording layer provided in the optical recording medium, wherein the information is recorded in the recording layer by holography.

<45> An optical recording medium comprising information recorded by using the optical recording method according to any one of <1> to <43>.

<46> An optical recording and reproducing method including reproducing recorded information corresponding to an interference image by applying a reference light to the interference image, wherein the interference image is formed in a recording layer using the optical recording method according to any one of <1> to <43>.

<47> The optical recording and reproducing method according to <46>, wherein the recorded information is reproduced by applying the reference light to the interference image at the same angle as an incident angle of the reference light applied at the time of recording information in the optical recording medium.

The present invention can solve the conventional problems and can provide an optical recording method, optical recording apparatus and optical recording medium, which are capable of effective control of light irradiation position, such as focusing control or tracking control, at the time of recording or reproducing and of efficiently adjusting the light irradiation position control according to variations in distance between layers such as a recording layer in an optical recording medium or according to manufacturing errors in optical recording and reproducing apparatus.

BEST MODE FOR CARRYING OUT THE INVENTION

Optical Recording Method

The optical recording method of the present invention includes a record focus position controlling step (step (i)) in which at least one of an information light and reference light is applied on an optical recording medium containing a recording layer for recording information by holography, for detection and control of focus positions of the information light and reference light in a thickness direction of the optical recording medium, and an interference image recording step (step (ii)) in which an interference image is formed by applying the information light and reference light and recorded in the recording layer, and optionally includes appropriately selected other steps, if necessary.

The optical recording method of the present invention can be performed by means of an optical recording apparatus of the present invention, and thus the details thereof will be explained through the explanations of the optical recording apparatus.

The record focus position controlling step of the optical recording method of the present invention is suitably performed by means of a record focus position controlling unit of the optical recording apparatus of the present invention.

The interference image recording step of the optical recording method of the present invention is suitably performed by means of an interference image recording unit of the optical recording apparatus of the present invention.

The other steps which are optionally included in the optical recording method of the present invention are suitably performed by means of other units equipped with the optical recording apparatus of the present invention.

<Record Focus Position Controlling Unit>

The record focus position controlling unit is a unit configured to apply at least one of an information light and reference light on an optical recording medium containing a recording layer for recording information by holography, for detection and control of focus positions of the information light and reference light in the optical recording medium.

In the optical recording medium, there is a limitation during the manufacturing process in reducing variations for example in the thickness of layers such as a recording layer and in the position where light with a selected wavelength is reflected. Additionally, there are errors in the mounting position of optical recording media in a recording apparatus as well as manufacturing errors in optical systems for light irradiation. Thus, such errors may be accumulated and then recording may not be properly performed.

Figure 1:
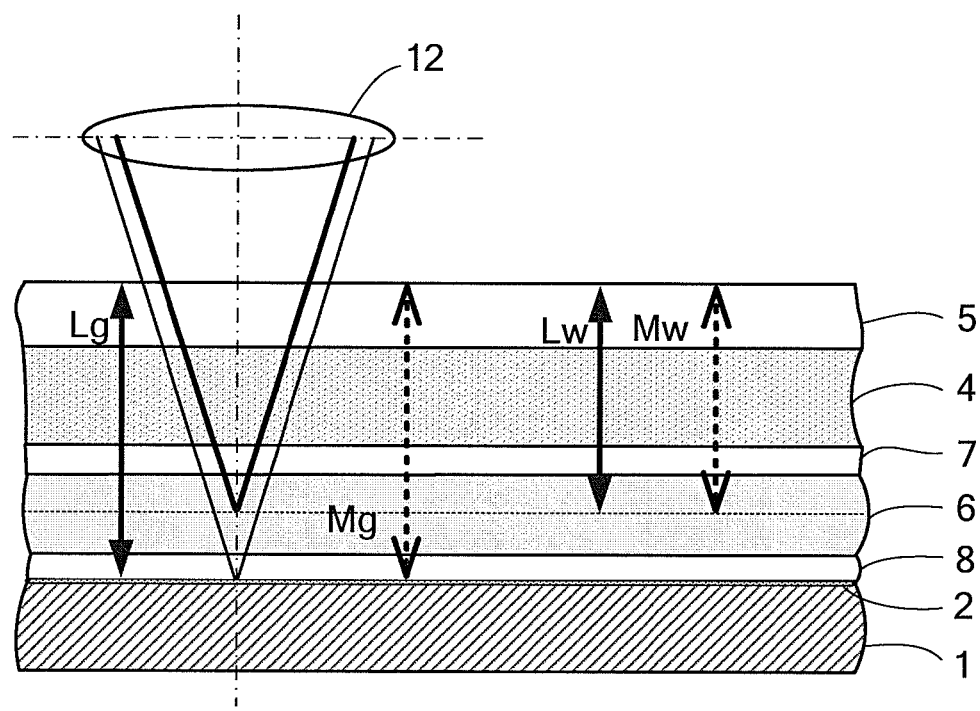
FIG. 1 is a conceptual diagram of the optical recording method of the present invention.
Figure 2:
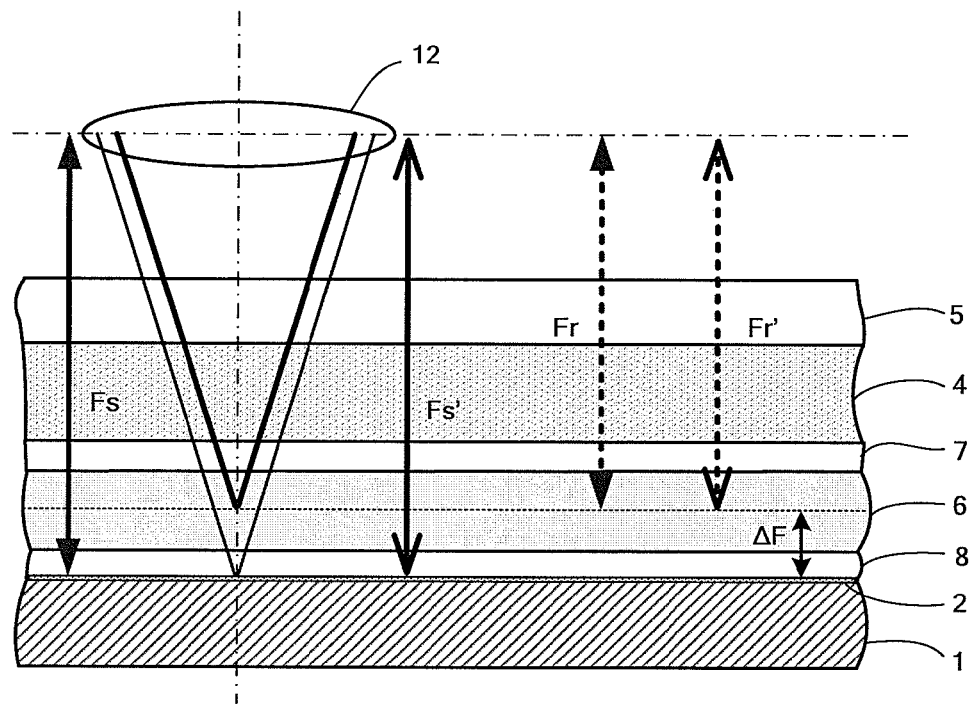
FIG. 2 is another conceptual diagram of the optical recording method of the present invention.

For example, regarding the positional relationship between an optical system for a servo light and an optical recording medium mounted to an optical recording apparatus, as shown in FIG. 2, when Fs is defined as a distance from the center of an objective lens 12 to a focal position of servo light, and Fs' is defined as a distance from the objective lens to a reflective surface of the reflective layer 2, Fs–Fs' is preferably within 10 µm. When Fs–Fs' is more than 10 µm, it is necessarily controlled to be within 10 µm.

Moreover, when Fr is defined as a distance from the center of the objective lens 12 to the focal position of the information light and reference light and when Fr' is defined as a distance from the objective lens to a selective reflection surface of a cholesteric liquid crystal layer 6, Fr–Fr' is preferably within 10 µm. When Fr–Fr' is more than 10 µm, it is necessarily controlled to be within 10 µm.

—Radiation of the Information Light and/or Reference Light—

The information light and/or the reference light is not particularly limited, and may be appropriately selected depending on the purpose. For example, the same light to that for recording, or a weaker light than the light for recording may be used. When the weaker light than the light for recording is used, the exposure energy is preferably 0.1 µJ/cm$^2$ to 10,000 µJ/cm$^2$, more preferably 1 µJ/cm$^2$ to 1,000 µJ/cm$^2$, and particularly preferably 10 µJ/cm$^2$ to 100 µJ/cm$^2$. When the exposure energy is less than 0.1 µJ/cm$^2$, the focus position may not be sufficiently detected. When the exposure energy is more than 10,000 µJ/cm$^2$, unintentional recording may be performed. The application of the information light or the reference light does not cause an interference of light, and thus is suitably applied for the detection of a focal distance. The application of both the information light and the reference light is used for the detection of a focal distance provided that the exposure energy is weakened enough not to perform unintentional recording on the optical recording medium. Additionally, an exposure energy as strong as that for recording is used for detection of a focal distance without weakening the exposure energy, provided that plural areas for detection are provided in the optical recording medium and used for checking the focal distance of the areas.

A method of detecting the focus position of the information light and/or the reference light in the record focus position controlling unit is not particularly limited, and may be appropriately selected depending on the purpose. Examples thereof include an astigmatism method, a Foucault method, and a critical angle method (refer to "Illustrative Compact Disc Handbook (Zukai Compact Disc Tokuhon)", by Hirataro Nakajima and Hiroshi Ogawa, Ohmsha Publishing, the first edition, Nov. 10, 1986).

—Astigmatism Method—

According to the astigmatism method, a deviation between a position to be recorded in a recording layer formed in an optical recording medium, and a focus position of the information light and/or the reference light is detected. Namely, it is detected that the deviation between the focal distance, i.e. a distance between the center of the objective lens and the focus of the information light and/or the reference light, and a distance from the center of the objective lens to the position to be recorded in the recording layer. In the astigmatism method, a beam splitter or the like is arranged in between a light source and the objective lens on a light path wherein the light is emitted from the light source, transmitted through the objective lens and applied to the optical recording medium. The reflected light is split by means of the beam splitter, and transmitted through a cylindrical lens to focus an image. When the focused image is circle, it is detected that the focal distance is matched. When the focused image is a vertically-long oval, it is detected that the optical recording medium is positioned too close relative to the objective lens. When the focused image is horizontally-long oval, it is detected the optical recording medium is positioned to far relative to the objective lens.

The detection is performed by splitting the reflective light into four beams, and comparing the brightness of focused images in the diagonal regions.

—Foucault Method—

The Foucault method uses the same configuration as the astigmatism method in terms of arrangement of a beam splitter, collection of reflected light, and transmission of the reflected light through the cylindrical lens. In the Foucault method, a prism is arranged at a place where the reflected light transmitted through the cylindrical lens is focused to form an image. When the image is focused at the apex angle of the prism, it is detected that the focal distance is matched. When the image is focused over the apex angle, it is detected that the optical recording medium is positioned too close relative to the objective lens. When the image is focused before the apex angle, it is detected that the optical recording medium is positioned too far relative to the objective lens. The focusing point of the image is detected by splitting the reflected light into two, allocating a sensor for each beam of light, and measuring the intensity of each beam.

The record focus position controlling unit is not particularly limited, and may be appropriately selected depending on the purpose. Examples thereof include a servo mechanism configured to correct deviation between the detected focus position and the just focus position on the basis of a result of the detected focus position, when the focus position is out of an allowable range.

The servo mechanism is not particularly limited, and may be appropriately selected depending on the purpose. Examples thereof include a mechanism such that a focus error signal is generated corresponding to the deviation, the signal is transmitted and provide an instruction to a driving device via a phase compensated drive amplifier which amplifies the signal, the driving device sifts a position of an objective lens, so as to control the focus position distance.

The driving device is not particularly limited, and may be appropriately selected depending on the purpose. Examples thereof include an actuator and a stepping motor.

<Interference Image Recording Unit>

The interference image recording unit is a unit configured to apply an information light and reference light, which are coherent each other, on the recording layer for recording information by holography so as to form an interference image (interference fringe) by the information light and reference light, and to record the interference image on the recording layer. The interference image recording unit is, for example a unit configured to record in the recording layer an interference fringe consisting of bright and dark parts with different refractive indices. In this unit, the recording layer contains a photosensitive material such as a photopolymer, and the photosensitive material induces a polymerization reaction in the bright part of the interference fringe as a result of light irradiation, and no polymerization reaction is occurred in the dark part of the interference fringe. Therefore, the refractive index in the bright part becomes higher, while the refractive index in the dark part is not changed. In this manner, differences in refractive index are generated.

The method of applying the information light and the reference light is not particularly limited, and may be appropriately selected depending on the purpose. For example, the reference light is applied at a certain angle with respect to the applied angle of the information light. Alternatively, the information light and the reference light are applied to the recording layer such that the optical axes thereof are collinearly aligned.

Of these, the recording is preferably performed by applying the information light and the reference light so as to align the optical axes thereof collinearly, namely, in accordance with a collinear system, since it enables high multiplex recording, and high information transfer speed.

As a light source for the information light and the reference light, a light source which emits a coherent laser beam is suitably used. Examples of the light sources include a solid laser oscillator, a semi-conductor laser oscillator, a liquid laser oscillator and a gas laser oscillator. Of these, the gas laser oscillator and the semi-conductor laser oscillator are preferable.

The laser beam is not particularly limited and may be appropriately selected depending on the purpose. For example, the laser beam is a light having a wavelength ranging from 360 nm to 850 nm. The wavelength of the laser beam is preferably 380 nm to 800 nm, more preferably 400 nm to 750 nm, and the most preferably 500 nm to 600 nm since it is in the center of the visible light range, and hence is the most recognizable.

When the wavelength is shorter than 360 nm, the clear interference image may not be obtained. When the wavelength is longer than 850 nm, the interference fringe becomes very precise, and thus it may not be able to obtain the photosensitive material which corresponds to the very precise interference fringe.

The exposure energy of the laser beam is not particularly limited, and may be appropriately selected depending on the purpose. For example, it is preferably 0.1 $\mu J/cm^2$ to 10,000 $\mu J/cm^2$, more preferably 1 $\mu J/cm^2$ to 1,000 $\mu J/cm^2$, and the most preferably 10 $\mu J/cm^2$ to 100 $\mu J/cm^2$. When the exposure energy is less than 0.1 $\mu J/cm^2$, the recording may not be performed. When the exposure energy is more than 10,000 $\mu J/cm^2$, unintentional recording may be preformed.

<Other Units>

Examples of the other units include a servo focus position controlling unit and an interference image fixing unit.

—Servo Focus Position Controlling Unit—

The servo focus position controlling unit is a unit configured to control a deviation of the focus position of the servo light in a thickness direction of the optical recording medium, and a deviation of the focus position of the servo light in a track surface direction of the optical recording medium.

The control of the focus position in the thickness direction of the optical recording medium may be performed separately from the record focus position controlling unit, and by applying the servo light on the optical recording medium so as to detect a reflective light from the optical recording medium. While, it may be performed on the basis of the result of the detected focus position of the information light and reference light used in the record focus position controlling unit, and not separately detect the focus position.

The control of a focus position in a thickness direction of the optical recording medium on the basis of a result of a detected focus position of the information light and reference light is not particularly limited and may be appropriately selected depending on the purpose. For example, as shown in FIG. 2, an optical recording method is used in which provided that a focal distance detected in the step (i) is defined as "Fr," and a focal distance in the thickness direction of the optical recording medium detected in the step (iii) is defined as "Fs" followed by detection of values for "Fr" and "Fs" at "n" positions and a difference in focal distance (Fs−Fr) at each of the "n" positions is defined as "$\Delta F$," when a difference between maximum and minimum values of $\Delta F$ is within a range of 0.1 μm to 100 μm, preferably 0.5 μm to 50 μm and more preferably 1 μm to 20 μm, an average value of $\Delta F$ for the "n" positions ($\Delta Fa$) is calculated and the servo light is applied so that a sum of the value of $\Delta Fa$ and an average value of Fr at the "n" positions (Fra), $\Delta Fa+Fra$, is equal to a focal distance of the servo light in the thickness direction of the optical recording medium, to thereby omit detection and control of the focus position in the thickness direction of the optical recording medium in the step (iii), and when the difference between the maximum and minimum values of $\Delta F$ is outside the range of 0.1 μm to 100 μm, preferably 0.5 μm to 50 μm and more preferably 1 μm to 20 μm, detection and control of the focus position in the thickness direction of the optical recording medium in the step (iii) is conducted.

The "n" positions are not particularly limited and may be appropriately selected depending on the purpose. For example, 3 to 30 positions are preferable, 5 to 10 positions are more preferable. When the number of "n" positions is less than 3, the uniformity of the optical recording medium may not be appropriately determined. When the number of "n" positions is more than 30, it takes time for detection and thus control efficiency may be lowered.

It is desirable that the "n" positions to be detected be equidistant from one another on the optical recording medium in view of increased reliability for determining uniformity.

When the optical recording medium is determined to be uniform, focusing control of the servo light can be omitted and control efficiency may be improved.

When the detection of a focus position in a thickness direction of the optical recording medium is performed separately from the record focus position controlling unit, a method of detecting the focus position is not particularly limited and may be appropriately selected depending on the purpose. Examples thereof include the astigmatism method, Foucault method, and critical angle method (refer to "Illustrative Compact Disc Handbook (Zukai Compact Disc Dokuhon)", by Hirataro Nakajima and Hiroshi Ogawa, Ohmsha Publishing, the first edition, Nov. 10, 1986), which are used in the record focus position controlling unit.

When the detection of a deviation of the focus position in the track surface direction of the optical recording medium is performed separately, a method of detecting the focus position in the servo focus position controlling unit is not particularly limited and may be appropriately selected depending on the purpose. Examples thereof include a three-beam method, a push-pull method, and a differential phase detection (DPD) method (refer to "Illustrative Compact Disc Handbook (Zukai Compact Disc Dokuhon)", by Hirataro Nakajima and Hiroshi Ogawa, Ohmsha Publishing, the first edition, Nov. 10, 1986).

—Three-Beam Method—

The three-beam method is a method which detects a deviation of a position of the applied servo light relative to a track formed on a disc to be detected. In the three-beam method, three beams including a substantially circular main beam, secondary beam A, and secondary beam B are used. The secondary beam A, the main beam, and the secondary beam B are equally spaced, and linearly arranged in this order. The main beam is disposed in a position where the center of the circle of the applied main beam is located in the middle of the width of the track. The secondary beam A is disposed in a position where the bottom of the circle of the applied secondary beam A contacts with the edge of the width of the track. The secondary beam B is disposed in a position where the top of the circle of the applied secondary beam B contacts with the edge of the width of the track.

When these beams are applied to the track in such the arrangement, a weak reflected light is reflected from the track surface, and the strong reflected light is reflected from other than the track surface. By detecting the intensity of each reflected lights, it can be detected a deviation between the applied positions of the three beams and the position of the track.

—Push-Pull Method—

The push-pull method is a method which detects a deviation between a position of the applied servo light and a track formed on a disc to be detected. In the push-pull method, one beam is applied on the track, and the deviation is detected by a half-split beam detector. The half-split beam detector detects the reflected light by splitting the reflected beam into two parts. When the beam is applied on the center of the track width, the intensity of each light split into the left part and the right part is detected as equal. When the beam is applied to either side of the track width, the intensity of the reflected beams are detected as weak at the track surface, but detected as strong at other than the track surface. The intensity of each beam split into the left part and the right part is therefore detected as asymmetrically distributed.

—Differential Phase Detection Method—

The DPD (Differential phase detection) method is a method which detects a deviation between a position of the applied servo light and a track formed on a disc to be detected. In the DPD method, a quarter-split beam detector is used. The quarter-split beam detector is further split the beam as of the half-split beam detector used in the push-pull method. When the beam is applied on the center of the track width, the intensity of the right part and the left part of the quarterly split light split into the four regions is detected as equal. When the beam is applied to either side of the track width, the intensity of the reflected beams are detected as weak at the track, but detected as strong at other than the track. The intensity of each quarterly split beam is detected as asymmetry with the left part and the right part by detecting the intensity distributions of a pair of the diagonally positioned regions within the quarterly split regions.

The servo focus position controlling unit is not particularly limited and may be appropriately selected depending on the purpose. For example, the same unit as the record focus position controlling unit may be used.

—Interference Image Fixing Unit—

The interference image fixing unit is a unit for applying a fixing light to the interference image recorded on the recording layer by means of the interference image recording unit so as to fix the recorded interference image on the recording layer. By sufficiently applying the fixing light to the area where the interference image is recorded, the interference image is efficiently fixed, the storage stability is improved as a result of the fixing, and there can be attained an optical recording medium which does not cause an error such as noise at the time of reproducing.

—Fixing Light—

The area of applying the fixing light is appropriately selected depending on the purpose. For example, it is preferably the same area as the recorded area which is recorded by the information light and the reference light at an arbitrary selected part in the recording layer, or preferably an area which is larger than the recorded area, and is extended from the outer boundary of the recorded area at 1 μm or less in the outer direction. When the fixing light is applied to an area which is extended from the outer boundary of the recorded area at over 1 μm, the fixing light may be also applied to the adjacent recorded area to the recorded area, the exposure energy of the fixing light becomes excessive, and thus it is inefficient.

The duration of applying the fixing light is not particularly limited, and may be appropriately selected depending on the purpose. For example, it is preferably 1 ns to 100 ms, and more preferably 1 ns to 80 ms at an arbitrary selected part in the recording layer. When the application duration is shorter than 1 ns, the fixing may be insufficient. When the application duration is longer than 100 ms, the applied exposure energy may become excessive. The fixing light is preferably applied within 28 hours from the recording of the interference image. When the fixing light is applied after 28 hours from the recording of the interference image, the signal quality of the recorded information may be lowered.

The direction of applying the fixing light is not particularly limited, and may be appropriately adjusted depending on the purpose. For example, the fixing light may be applied in the same direction as, or different direction from the information light and the reference light at an arbitrary selected part on the recording layer. The angle of applying the fixing light is preferably 60° or less, and more preferably 400 or less with respect to the surface of the recording layer. When the application angle is outside the aforementioned range, the fixing may be inefficient.

The wavelength of the fixing light is not particularly limited, and may be appropriately selected depending on the purpose. For example, the fixing light has a wavelength of preferably 350 nm to 850 nm, and more preferably 400 nm to 600 nm at an arbitrary selected part on the recording layer.

When the fixing light has a wavelength of less than 350 nm, the material of the recording layer may be decomposed. When the fixing light has a wavelength of more than 850 nm, the material of the recording layer may be deteriorated due to the elevation of the temperature.

The light source of the fixing light is not particularly limited, and may be appropriately selected depending on the purpose. For example, the light source is preferably identical to the light source of the information light and the reference light since it is not necessary to newly dispose another light source only for the fixing light. The light source for the information light and the reference light is also used as the light source for the fixing light by applying the emitted light from the light source to the optical recording medium. By using the same light source, the application area of the fixing light can be easily matched with the recorded area of the interference image, and thus the fixing light is efficiently applied.

The exposure dose of the fixing light is not particularly limited, and may be appropriately selected depending on the purpose. For example, it is preferably 0.001 mJ/cm$^2$ to 100 mJ/cm$^2$, and more preferably 0.01 mJ/cm$^2$ to 10 mJ/cm$^2$ at an arbitrary selected part in the recording layer.

The method of applying the fixing light is not particularly limited, and may be appropriately selected depending on the purpose. For example, it is preferably a method wherein the light emitted from the light source identical to that for the information light and the reference light is applied to an arbitrary selected part in the recording layer. Alternatively, the light emitted from another light source may be applied as the fixing light.

<Optical Recording Medium>

The optical recording medium of the present invention contains a substrate and at least a recording layer above the substrate, in which recording layer information is recorded by holography, and a recorded interference image is fixed therein by applying the fixing light.

The optical recording medium of the present invention may be a relatively thin recording medium for a flat holography which records two-dimensional information, etc., or a recording medium for a volume holography capable of recording large volume of information such as three-dimensional images. Moreover, the optical recording medium of the present invention may be a reflective holographic recording medium, or a transmission holographic recording medium. Furthermore, examples of the holographic recording systems for the optical recording medium of the present invention include an amplitude holography, a phase holography, a blazed holography and a complex amplitude holography.

Specifically, the optical recording medium is preferably a reflective optical recording medium which is utilized for a collinear optical recording system. Such optical recording medium contains a first substrate, a recording layer, a filter layer, and a second substrate, and optionally contains other layers, if necessary.

<Recording Layer>

The recording layer contains a photosensitive material capable of recording information by holography. The photosensitive material is a material which changes its optical property such as extinction coefficient or refractive index corresponding to a intensity of an emitted electromagnetic wave having the predetermined wavelength.

The material of the recording layer is not particularly limited, and may be appropriately selected depending on the purpose. Examples thereof include: (1) photopolymers which are polymerized as a result of polymerization reactions induced by light irradiation; (2) photorefractive materials exhibiting a photorefractive effect (changing their refractive index as a result of a spatial charge distribution induced by light irradiation); (3) photochromic materials which change their refractive index as a result of a molecular isomerization caused by light irradiation; (4) inorganic materials such as lithium niobate, and barium titanate; (5) chalcogen materials.

The photopolymers (1) are not particularly limited, and may be appropriately selected depending on the purpose. For example, the photopolymer contains a monomer, and a photoinitiator, and optionally contains other components such as a sensitizer, oligomer, and the like, if necessary.

Examples of the photopolymers include those described in, for example, "Photopolymer Handbook" (Kogyo Chosakai Publishing Co., Ltd., 1989), "Photopolymer Technology" (Nikkan Kogyo Shinbun, 1989), SPIE Proceedings Vol. 3010 p. 354-372 (1997) and SPIE Proceedings Vol. 3291 p. 89-103 (1998). Also, examples of the photopolymers include those described in U.S. Pat. Nos. 5,759,721, 4,942,112, 4,959,284 and 6,221,536, International Publication Nos. WO97/44714, WO97/13183, WO99/26112 and WO97/13183, Japanese Patent (JP-B) Nos. 2880342, 2873126, 2849021, 3057082 and 3161230, Japanese Patent Application Laid-Open (JP-A) Nos. 2001-316416 and 2000-275859.

Examples of the methods for applying a recording light to the photopolymer so as to change its optical property include a method using dispersion of low molecular substances. In this method, a substance which disperses to the direction opposite to the polymerizing direction of the polymerizable substance is added in order to reduce volume change during polymerization. Alternatively, a compound having an acid cleavage structure is optionally added to the photopolymer. In the case that the recording layer is formed by using a photopolymer containing the low molecular substance, it is necessary that the recording layer has a structure which is able to hold a liquid therein. When the compound having an acid cleavage structure is added, the volume change can be controlled by compensating the expansion caused by the cleavage with the shrinkage caused by the polymerization of the monomer, or vise versa.

The monomer is not particularly limited, and may be appropriately selected depending on the purpose. Examples thereof include radical polymerizable monomers having an unsaturated bond such as acryl and methacryl groups and cation polymerizable monomers having an ether structure such as epoxy and oxetane rings. These monomers may be monofunctional or multifunctional, and may also be those utilizing a photo-crosslinking reaction.

Examples of the radical polymerizable monomers include acryloylmorpholine, phenoxyethyl acrylate, isobornyl acrylate, 2-hydroxypropyl acrylate, 2-ethylhexyl acrylate, 1,6-hexanediol diacrylate, tripropylene glycol diacrylate, neopentyl glycol PO modified diacrylate, 1,9-nonanediol diacrylate, hydroxypivalate neopentyl glycol diacrylate, EO modified bisphenol A diacrylate, polyethylene glycol diacrylate, pentaerythritol triacrylate, pentaerythritol tetraacrylate, pentaerythritol hexaacrylate, EO modified glycerol triacrylate, trimethylolpropane triacrylate, EO modified trimethylolpropane triacrylate, 2-naphtho-1-oxyethyl acrylate, 2-carbazoyl-9-yl-ethyl acrylate, (trimethylsilyloxy) dimethylsilylpropyl acrylate, vinyl-1-naphthoate and N-vinyl carbazole.

Examples of the cation polymerizable monomers include bisphenol A epoxy resins, phenol novolak epoxy resins, glycerol triglycidyl ether, 1,6-hexane glycidyl ether, vinyl trimethoxysilane, 4-vinylphenyl trimethoxysilane, γ-methacryloxypropyl triethoxysilane and compounds expressed by the following Structural Formulas (A) to (E).

These monomers may be used alone or in combination of two or more.

Structural Formula (A)

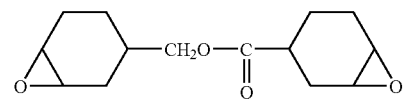

-continued

Structural Formula (B)

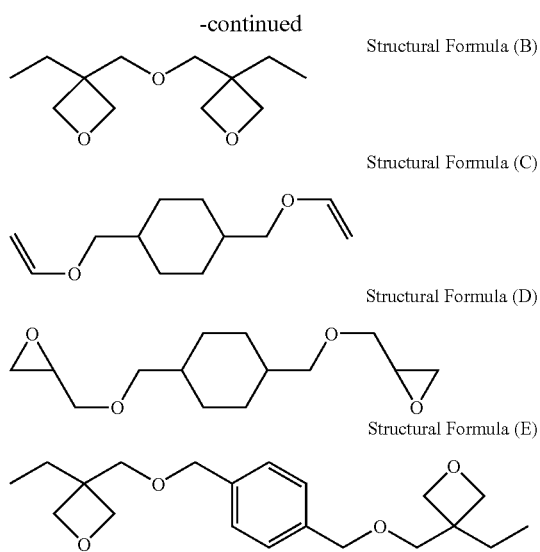

Structural Formula (C)

Structural Formula (D)

Structural Formula (E)

The photoinitiator is not particularly limited as long as it has a sensitivity to the recording light. Examples thereof include materials which induce radical polymerization, cation polymerization and crosslinking reaction by light irradiation.

Examples of the photoinitiators include 2,2'-bis(o-chlorophenyl)-4,4',5,5'-tetraphenyl-1,1'-biimidazole, 2,4,6-tris (trichloromethyl)-1,3,5-triazine, 2,4-bis(trichloromethyl)-6-(p-methoxyphenylvinyl)-1,3,5-triazine, diphenyliodonium tetrafluoroborate, diphenyliodonium hexafluorophosphate, 4,4'-di-t-butyl diphenyliodonium tetrafluoroborate, 4-diethylaminophenylbenzenediazonium hexafluorophosphate, benzoin, 2-hydroxy-2-methyl-1-phenylpropane-2-one, benzophenone, thioxanthone, 2,4,6-trimethylbenzoyldiphenylacylphosphine oxide, triphenylbutyl borate tetraethyl ammonium and titanocene compounds expressed by the following Structural Formulas. These may be used alone or in combination of two or more. A sensitizing dye may be combined in accordance with the wavelength of irradiation light.

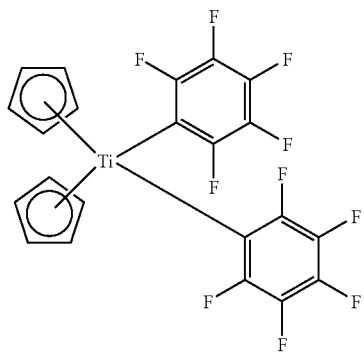

The photopolymer is obtained by stirring and mixing the monomer, the photoinitiator and if necessary other components to react them. When the resultant photopolymer has a sufficiently low viscosity, the recording layer can be formed by casting. Meanwhile, when the photopolymer has a high viscosity, which can not be cast, the recording layer can be formed by placing the photopolymer on the second substrate using a dispenser and pressing the second substrate A against the photopolymer as if covering with a lid to spread over the entire surface thereof.

The photorefractive materials (2) are not particularly limited, and may be appropriately selected depending on the purpose, as long as it exhibits the photorefractive effect. Examples thereof include those containing a charge generating material and a charge transporting material, and further contains other components, if necessary.

The charge generating material is not particularly limited, may be appropriately selected depending on the purpose. Examples thereof include phthalocyanine dyes/pigments such as metal phthalocyanine and non-metal phthalocyanine and derivative thereof; naphthalocyanine dyes/pigments; azo based dyes/pigments such as monoazo-, diazo- and triazo-dyes/pigments; perylene based dyes/pigments; indigo based dyes/pigments; quinacridone based dyes/pigments; polycyclic quinone based dyes/pigments such as anthraquinone and anthoanthorone; cyanine based dyes/pigments; charge transfer complexes composed of an electron receiving substance and an electron releasing substance such as TTF-TCNQ; azulenium salts; fullerene such as $C_{60}$ and $C_{70}$ and methanofullerene which is a derivative thereof. These may be used alone or in combination of two or more.

The charge-transporting material is the material which transports a hole or an electron, and may be a low-molecular compound or a high-molecular compound.

The charge-transporting material is not particularly limited, and may be appropriately selected depending on the purpose. Examples thereof include nitrogen-containing cyclic compounds such as indole, carbazole, oxazole, inoxazole, thiazole, imidazole, pyrazole, oxadiazole, pyrazoline, thiathiazole and triazole, and derivative thereof; hydrazine compounds; triphenylamines; triphenylmethanes; butadienes; stilbenes; quinone compounds such as anthraquinone diphenoquinone, and derivatives thereof; fullerenes such as $C_{60}$ and $C_{70}$ and derivatives thereof, π conjugated polymers or oligomers such as polyacetylene, polypyrrol, polythiophene and polyaniline; σ conjugated polymers or oligomers such as polysilane and polygermane; polycyclic aromatic compounds such as anthracene, pyrene, phenanthrene and coronen. These may be used alone or in combination of two or more.

As the method of forming the recording layer using the photorefractive material, for example, forming a coating film using a coating liquid in which the photorefractive material is dissolved or dispersed therein, and removing the solvent from the coating film so as to form the recording film. Also, the recording layer can be formed by forming a coating film using the photorefractive material which is heated to fluidize and rapidly cooling the coating film.

The photochromic materials (3) are not particularly limited and may be appropriately selected depending on the purpose, as long as it causes a photochromic reaction. Examples thereof include azobenzene compounds, stilbene compounds, indigo compounds, thioindigo compounds, spiropyran compounds, spirooxazine compounds, fluxide compound, anthracene compounds, hydrazon compounds and cinnamate compounds. Of these, the azobenzene derivatives and the stilbene derivatives which cause the structural change due to cis-trans isomerization by light irradiation, and the spiropyran derivatives and the spirooxazine derivatives which cause the structural change of ring-opening/ring-closing by light irradiation are particularly preferable.

Examples of the above-described chalcogen materials (5) include a material containing chalcogenide glass which contains a chalcogen element, and metallic particles composed of a metal dispersed in the chalcogenide glass and diffusible therein by light irradiation.

The chalcogenide glass is composed of a non-oxide based amorphous material containing the chalcogen element such as S, Te or Se, and is not particularly limited as long as it can optically dope the metallic particles.

Examples of the amorphous materials containing the chalcogen element include Ge—S based glass, As—S based glass, As—Se based glass and As—Se—Ce based glass. Of these, the Ge—S based glass is preferable. When the Ge—S based glass is used as the chalcogenide glass, a composition ratio of Ge and S which compose the glass can be optionally changed depending on the wavelength of irradiation light, but the chalcogenide glass having a chemical composition mainly represented by $GeS_2$ is preferable.

The metallic particles are not particularly limited and may be appropriately selected depending on the purpose, as long as they have the property of optically doped in the chalcogenide glass by light irradiation. Examples thereof include Al, Au, Cu, Cr, Ni, Pt, Sn, In, Pd, Ti, Fe, Ta, W, Zn and Ag. Of these, Ag, Au or Cu has a property of easily optically-doped and Ag is particularly preferable because it is remarkably optically doped.

The content of the metallic particles dispersed in the chalcogenide glass is preferably 0.1% by volume to 2% by volume and more preferably 0.1% by volume to 1.0% by volume based on the total volume of the recording layer. When the content of the metallic particles is less than 0.1% by volume, insufficient transmittance change by the optical dope leads to the reduction of an accuracy of recording. When it exceeds 2% by volume, the light transmittance of the recording material is reduced and it may be difficult to be sufficiently optically-doped.

The recording layer may be formed according to a method known in the art depending on the materials, and may be suitably formed by, for example, a vapor deposition method, a wet film forming method, an MBE (molecular beam epitaxy) method, a cluster ion beam method, a molecular lamination method, an LB method, a printing method or a transfer method. Of these, the vapor deposition method and the wet film forming method are preferable.

The vapor deposition method is not particularly limited, and may be appropriately selected from the known methods depending on the purpose. Examples thereof include a vacuum vapor deposition method, a resistance heating deposition method, a chemical vapor deposition (CVD) method, and a physical vapor deposition method. Examples of the chemical vapor deposition method include a plasma CVD method, a laser CVD method, a heat CVD method, and a gas source CVD method.

The formation of the recording layer by the wet film forming method may be suitably performed by using (applying and drying) the solution (coating liquid) in which the materials of the recording layer have been dissolved or dispersed in the solvent. The wet film forming method is not particularly limited and may be appropriately selected from those known in the art depending on the purpose. Examples thereof include an inkjet method, a spin coating method, a kneader coating method, a bar coating method, a blade coating method, a casting method, a dipping method and a curtain coating method.

The thickness of the recording layer is not particularly limited and may be appropriately selected depending on the purpose. It is preferably 1 μm to 1,000 μm and more preferably 100 μm to 700 μm.

When the thickness of the recording layer is within the aforementioned preferable range, the sufficient S/N ratio can be attained on the shift multiplex of 10 to 300. When the thickness is within the aforementioned more preferred range, such the technical effect becomes significant.

—Filter Layer—

The filter layer is a layer (selective reflection film) which selectively reflects light, namely transmitting a first light, and reflecting a second light which is different from the first light. The filter layer is, for example, an inorganic filter layer which contains a colored material-containing layer, and a dielectric material-deposited layer, or an organic filter layer which contains the cholesteric liquid crystal layer.

—Colored Material-Containing Layer—

The colored material-containing layer contains a colored material, a binder resin, and a solvent, and optionally contains other components, if necessary.

The colored material contains at least one of pigments and dyes. Of these, red dyes and red pigments are preferable since they absorb a light having a wavelength of 532 nm, but transmit a servo light having a wavelength of 655 nm. Moreover, the red pigments are particularly preferable.

The red dyes are not particularly limited, and can be selected from the known products depending on the purpose. Examples thereof include: acid dyes such as C. I. Acid Reds 1, 8, 13, 14, 18, 26, 27, 35, 37, 42, 52, 82, 87, 89, 92, 97, 106, 111, 114, 115, 134, 186, 249, 254 and 289; basic dyes such as C. I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and reactive dyes such as C. I. Reactive Reds 1, 14, 17, 25, 26, 32, 37, 44, 46, 55, 60, 66, 74, 79, 96 and 97. These may be used alone or in combination of two or more.

The red pigments are not particularly limited, and can be appropriately selected from the known products depending on the purpose. Examples thereof include C. I. Pigment Reds 9, 97, 122, 123, 149, 168, 177, 180, 192, 209, 215, 216, 217, 220, 223, 224, 226, 227, 228, 240, C. I. Pigment Red 48:1, Permanent Carmine FBB (C. I. Pigment Red 146), Permanent Ruby FBH (C. I. Pigment Red 11) and Faster Pink B Supra (C. I. Pigment Red 81). These may be used alone or in combination of two or more.

Of these, the particularly preferable colored material is a red pigment which shows a transmittance spectrum such that a transmittance of the light having a wavelength of 532 nm is 10% or less and a transmittance of the light having a wavelength of 655 nm is 90% or more.

The content of the colored material is preferably 0.05% by mass to 90% by mass, and more preferably 0.1% by mass to 70% by mass on the basis of the total solids content of the colored material-containing layer. When the content is less than 0.05% by mass, the thickness of the colored material-containing layer needs to be 500 μm or more. When the content is more than 90% by mass, the colored material-containing layer cannot self-support itself, and thus the layer may be broken down during the process of forming the colored material-containing layer.

—Binder Resin—

The binder resin is not particularly limited, and may be appropriately selected from the known binders depending on the purpose. Examples thereof include a polyvinyl alcohol resin, a vinyl chloride-vinyl acetate copolymer, a copolymer of vinyl chloride or vinyl acetate and at least one selected from vinyl alcohol, maleic acid, and acrylic acid, a vinyl chloride-vinyliden chloride copolymer, a vinyl chloride-acrylonitrile copolymer, an ethylene-vinyl acetate copolymer, a cellulose derivative such as a nitrilocellulose resin, a polyacrylic resin, a polyvinyl acetal resin, a polyvinyl butyral resin, an epoxy resin, a phenoxy resin, a polyurethane resin, a polycarbonate resin and the like. These may be used alone or in combination of two or more.

A polar group is preferably introduced into the binder resins so as to further improve dispersibility and durability thereof. The polar group is at least one selected from the group consisting of epoxy groups, $CO_2H$, OH, $NH_2$, $SO_3M$, $OSO_3M$, $PO_3M_2$ and $OPO_3M_2$. Note that M denotes a hydrogen atom, alkali metal or ammonium, and when more than one M is present in one polar group, those may be identical to or deferent from each other. The content of the polar group is preferably $10^{-6}$ to $10^{-4}$ equivalent with respect to one gram of the binder resin.

The binder resin is preferably subjected to a curing treatment by adding the known crosslinking agent such as an isocyanate crosslinking agent.

The content of the binder resin is preferably 10% by mass to 99.95% by mass, and more preferably 30% by mass to 99.9% by mass on the basis of the total solids content of the colored material-containing layer.

The components are dissolved and/or dispersed in a suitable solvent to prepare a coating liquid, and the coating liquid is applied on a substrate, which will be described later, in accordance with an arbitrarily selected coating method to thereby form a colored material-containing layer.

The solvent is not particularly limited and may be appropriately selected from those known in the art depending on the purpose. Examples thereof include water, alkoxypropionate esters such as methyl 3-methoxypropionate ester, ethyl 3-methoxypropionate ester, propyl 3-methoxypropionate ester, methyl 3-ethoxypropionate ester, ethyl 3-ethoxypropionate ester and propyl 3-ethoxypropionate ester; esters of alkoxy alcohol such as 2-methoxypropyl acetate, 2-ethoxypropyl acetate and 3-methoxybutyl acetate; lactate esters such as methyl lactate and ethyl lactate; ketones such as methyl ethyl ketone, cyclohexanone and methyl cyclohexanone; γ-butylolactone, N-methylpyrrolidone, dimethyl sulfoxide, chloroform and tetrahydrofuran. These may be used alone or in combination of two or more.

The coating method is not particularly limited, and may be appropriately selected depending on the purpose. Examples thereof include an ink-jet method, a spin-coating method, a kneader-coating method, a bar-coating method, a blade-coating method, a casting method, a dip-coating method and a curtain-coating method.

The thickness of the colored material-containing layer is preferably 0.5 μm to 200 μm, and more preferably 1 μm to 100 μm. When the thickness is less than 0.5 μm, the addition amount of the binder resin may not be enough to coat the colored material so as to form a film. When the thickness is more than 200 μm, the thickness of the filter becomes too thick, and thus an excessively large optical system for irradiation light and the servo light may be required.

—Dielectric Material-Deposited Layer—

The dielectric material-deposited layer is formed on the colored material-containing layer, and is a laminate of two or more dielectric films each having mutually different refractive index. In order to make the layer selectively reflective, the dielectric material-deposited layer is preferably a laminate of two or more layers wherein a dielectric film having a high refractive index, and a dielectric film having a low refractive index are alternately disposed. In this case, two different dielectric films may be laminated, or more than two different dielectric films may be laminated.

The number of the films to be laminated is preferably 2 to 20, more preferably 2 to 12, still more preferably 4 to 10, and particularly preferably 6 to 8. When the number of the films are more than 20, the production efficiency is lowered as a large number of films need to be deposited, and thus the objects and effects of the present invention may not be achieved.

The lamination order of the dielectric films is not particularly limited, and can be appropriately selected depending on the purpose. For example, a dielectric film having a lower refractive index is deposited first in a case where the adjacent dielectric film has a high refractive index. On the other hand, a dielectric film having a higher refractive index is deposited first in a case where the adjacent dielectric film has a low refractive index. The criteria of refractive index for determining whether a dielectric film has high or low refractive index is preferably set to 1.8. However, this determination is made on an arbitrary basis. Among the dielectric films having high refractive indices, there may be films having relatively higher refractive indices and films having relatively lower refractive indices, and these may be alternately disposed to form the dielectric material-deposited layer.

Examples of the materials for the dielectric film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TlCl, $Y_2O_3$, ZnSe, ZnS and $ZrO_2$. Of these, preferred are $Bi_2O_3$, $CeO_2$, $CeF_3$, $HfO_2$, SiO, $Ta_2O_5$, $TiO_2$, $Y_2O_3$, ZnSe, ZnS and $ZrO_2$; and particularly preferred are SiO, $Ta_2O_5$, $TiO_2$, $Y_2O_3$, ZnSe, ZnS, and $ZrO_2$.

Examples of the materials for the dielectric film having a low refractive index include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$ and $ThF_4$. Of these, preferred are $Al_2O_3$, $BiF_3$, $CaF_2$, $MgF_2$, MgO, $SiO_2$, and $Si_2O_3$; and particularly preferred are $Al_2O_3$, $CaF_2$, $MgF_2$, MgO, $SiO_2$ and $Si_2O_3$.

The atomic ratio of the material for the dielectric film is not particularly limited, and may be appropriately selected depending on the purpose. The atomic ratio is adjusted, for example, by changing the density of the atmospheric gas at the time of forming the film.

The method of forming the dielectric film is not particularly limited, and may be appropriately selected depending on the purpose. Examples thereof include vacuum vapor deposition methods such as an ion-plating method, and an ionic-beam method; physical vapor deposition (PVD) methods such as a sputtering method; and chemical vapor deposition (CVD) methods. Of these, the vacuum vapor deposition method and the sputtering method are preferable, and the sputtering method is particularly preferable.

The sputtering method is preferably a DC sputtering method which has a high rate of film formation. In the DC sputtering method, a material having high conductivity is preferably used.

A method for forming a multi-layered film in accordance with the sputtering is, for example, (1) a one-chamber method wherein a film formation is performed by using a plurality of targets alternately or sequentially within one chamber, or (2) a multi-chamber method wherein a film formation is performed continuously in a plurality of chambers. The multi-camber method is particularly preferred in view of the production efficiency and prevention of the material contamination.

The thickness of the dielectric film is preferably λ/16 to λ, more preferably λ/8 to 3λ/4, and still more preferably λ/6 to 3λ/8 of optical wavelength order.

In the dielectric material-deposited layer, a part of the light propagating through the dielectric material-deposited layer is multiply reflected by each of the dielectric films, the reflected beams of the light are interfered each other, and light only at certain wavelength is selectively transmitted. Such the wavelength is determined by the multiplication of the thickness of the dielectric film and the refractive index of the dielectric film. The center transmission wavelength of the dielectric material-deposited layer has an angle dependency to incident light, and thus the transmission wavelength can be changed by varying an incident angle of the light.

Since the number of the laminated layers of the dielectric material-deposited layer is 20 or less, a few to several tens percents of the selective reflection wavelength light is leaked and transmitted through the filter, but the leaked light is absorbed by the colored material-containing layer disposed just under the dielectric material-deposited layer. As the colored material-containing layer contains red pigments or red dyes, the colored material-containing layer absorbs a light having a wavelength of 350 nm to 600 nm, but transmits a light having a wavelength of 600 nm to 900 nm which is used for the servo light.

The filter layer containing the colored material-containing layer and the dielectric material-deposited layer is preferably configured to transmit first light having a certain wavelength, and to reflect second light having another wavelength. The first light preferably has a wavelength of 350 nm to 600 nm, and the second light preferably has a wavelength of 600 nm to 900 nm. To achieve this function, the optical recording medium preferably has a structure such that the recording layer, the dielectric material-deposited layer, the colored material-containing layer, and the servo-pit pattern are disposed in this order from the side where an optical system is arranged.

The thickness of the inorganic filter layer is preferably 0.5 µm to 200 µm, and more preferably 1 µm to 100 µm.

—Cholesteric Liquid Crystal Layer—

The cholesteric liquid crystal layer contains at least a nematic liquid crystal compound and a chiral compound, further contains a polymerizable monomer and sill further contains other components, if necessary.

The cholesteric liquid crystal layer may be a single layer or two or more of the layers are laminated. The number of laminated layers is not particularly limited and may be appropriately selected depending on the purpose, for example, 2 to 10 layers are preferred. When more than 10 laminated layers are used, on the contrary, the production efficiency may be lowered and the object and effects of the present invention may not be accomplished.

As the cholesteric liquid crystal layer, those having circularly-polarized-light-separating property are preferred. The cholesteric liquid crystal layer having the circularly-polarized-light-separating property has the selective reflection property of reflecting only the light of a circularly polarized light component in which the rotation direction (clockwise or counterclockwise) of the helix in the liquid crystal is identical to a circularly polarized light direction, and the wavelength is a helical pitch of the liquid crystal. By utilizing the selective reflection property of the cholesteric liquid crystal layer, only the circularly polarized light having the specific wavelength is transmitted and separated from natural light in a certain wavelength band, and the remaining thereof is reflected.

Therefore, in the cholesteric liquid crystal layer, it is preferable that the first light is transmitted and the circularly polarized light of the second light which is different from the first light is reflected. The first light preferably has a wavelength of 350 nm to 600 nm and the second light preferably has a wavelength of 600 nm to 900 nm.

The selective reflection property of the cholesteric liquid crystal layer is limited to the specific wavelength band, and is difficult to cover a visible light region. That is, a selective reflection wavelength band width $\Delta\lambda$ in the cholesteric liquid crystal layer is expressed by the following Equation 1.

$$\Delta\lambda = 2\lambda(ne-no)/(ne+no): \qquad \text{<Equation 1>}$$

where "no" represents a refractive index of a nematic liquid crystal molecule for a normal light, contained in the cholesteric liquid crystal layer, "ne" represents the refractive index of the nematic liquid crystal molecule for an abnormal light, and $\lambda$ represents a selective reflection center wavelength.

As can be seen from Equation 1, the selective reflection wavelength band width $\Delta\lambda$ is dependent on the molecular structure of the nematic liquid crystal itself, and it is possible to increase $\Delta\lambda$ by increasing (ne−no). However, (ne−no) is generally set to 0.3 or less. When (ne−no) is greater than 0.3, liquid crystal properties (e.g., alignment property and liquid crystal temperature) may be insufficient, and practical application may be difficult. Therefore, the selective reflection wavelength band width $\Delta\lambda$ in the cholesteric liquid crystal layer is about 150 nm at a maximum, and generally preferably about 30 nm to 100 nm.

The selective reflection center wavelength $\lambda$ in the cholesteric liquid crystal layer is expressed by the following Equation 2.

$$\lambda = (ne+no)P/2 \qquad \text{<Equation 2>}$$

wherein "ne" and "no" are identical to those in Equation 1, and "P" represents a helical pitch length for each turn of the cholesteric liquid crystal helix.

As shown in Equation 2, the selective reflection center wavelength $\lambda$ is dependent on a birefringence index difference $\Delta n$ and an average helical pitch length P of the cholesteric liquid crystal layer, when the average helical pitch length P is constant. Thus, to enlarge the selective reflection property of the cholesteric liquid crystal layer, each of the cholesteric liquid crystal layers preferably has different selective reflection center wavelength and the same rotation direction of the helix (clockwise or counterclockwise).

The selective reflection wavelength band in each of the cholesteric liquid crystal layers is preferably continuous with each other. As used herein, "continuous" means that no gap is present between two selective reflection wavelength bands and the reflectance in this range is substantially 40% or more.

Therefore, it is preferable that the distance between the selective reflection center wavelengths $\lambda$ in each of the cholesteric liquid crystal layers be in the range in which each of the selective reflection wavelength band is continuous to at least one of other selective reflection wavelength bands.

The cholesteric liquid crystal layer may be a laminate of a base and a cholesteric liquid crystal layer to form a filter for the optical recording medium, or a laminate of a substrate and the filter for the optical recording medium. The cholesteric liquid crystal layer may be directly disposed on the substrate.

<Filter for Optical Recording Medium>

The filter for the optical recording medium is a laminate of a base and single or multi layered cholesteric liquid crystal layer disposed on the base. The optical property of the filter for the optical recording medium may be appropriately selected depending on the intended purpose. For example, the filter preferably has a light reflectance of 40% or more relative to a light having a wavelength range of $\lambda_0$ to $\lambda_0/\cos 20°$ (where $\lambda_0$ represents the wavelength of irradiation light) incident at an angle of ±20° when the vertical incidence is 0°. Particularly preferably, the filter has a light reflectance of 40% or more relative to a light having a wavelength range of $\lambda_0$ to $\lambda_0/\cos 40°$ (where $\lambda_0$ represents the wavelength of irradiation light) incident at an angle of ±40° when the vertical incidence is 0°.

When the light reflectance is 40% or more relative to a light having a wavelength range of $\lambda_0$ to $\lambda_0/\cos 20°$, and particularly $\lambda_0$ to $\lambda_0/\cos 40°$ (where $\lambda_0$ represents the wavelength of irradiation light), it is possible to eliminate the angle dependency of the reflection of irradiation light and employ a lens optical system used for the ordinary optical recording medium.

Figure 4:
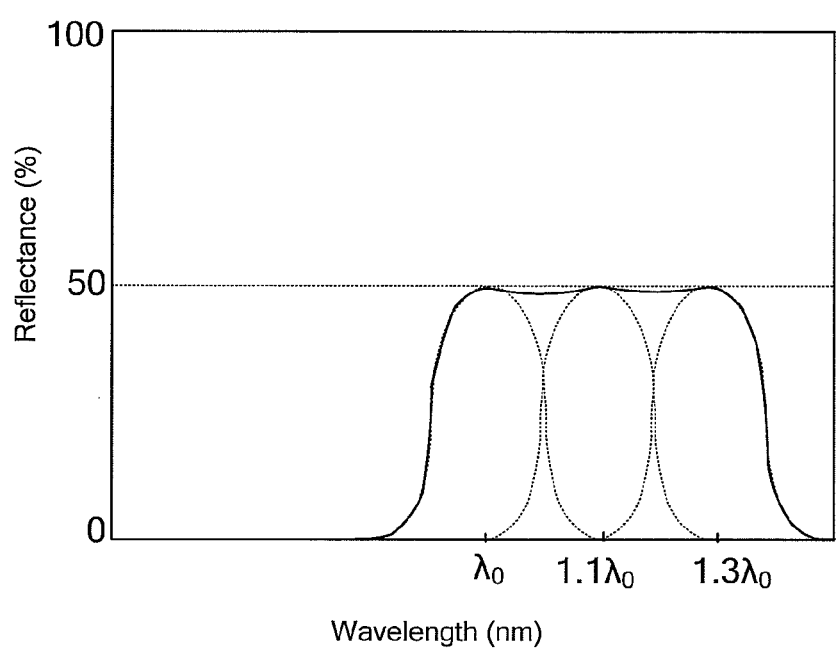
FIG. 4 is a graph showing reflection characteristics of a cholesteric liquid crystal layer.
Figure 5:
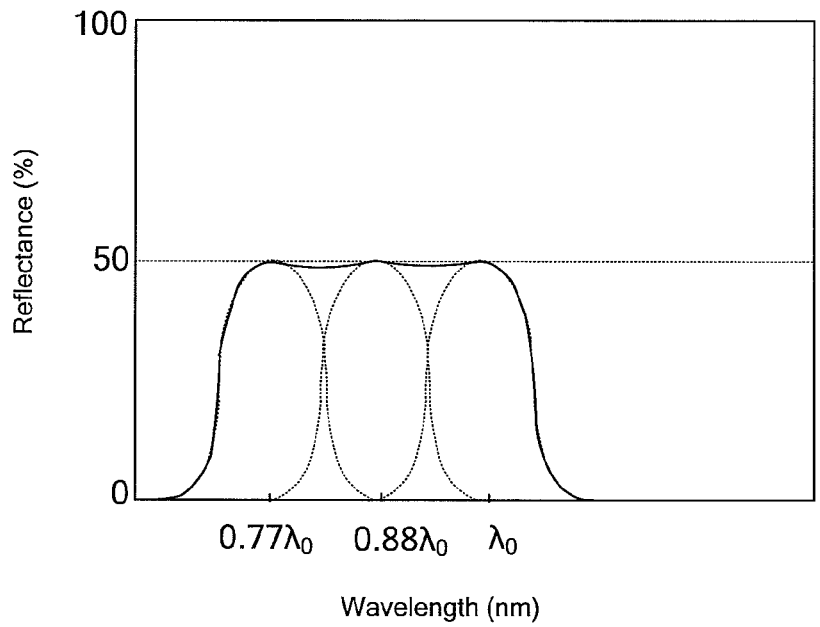
FIG. 5 is another graph showing reflection characteristics of a cholesteric liquid crystal layer.

Specifically, a filter for the optical recording medium having the reflection property shown in FIG. 4 is obtained by laminating three cholesteric liquid crystal layers having different selective reflection center wavelengths, and having the same rotation direction of the helix. FIG. 4 shows that the reflectance of the filter for a vertical incident light (0°) is 40% or more. In contrast to this, the reflection property peak shifts to shorter wavelengths as light is incident from the oblique directions, and the reflection property is as that shown in FIG. 5 when a light is inclined at an angle of 40° in the liquid crystal layer.

Figure 6:
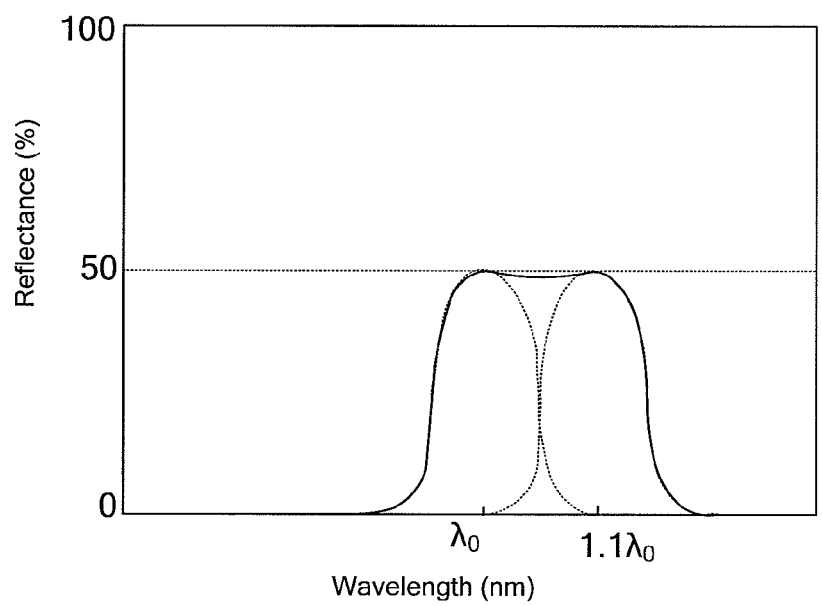
FIG. 6 is a graph showing the number of laminated cholesteric liquid crystal layers and reflection characteristics.
Figure 7:
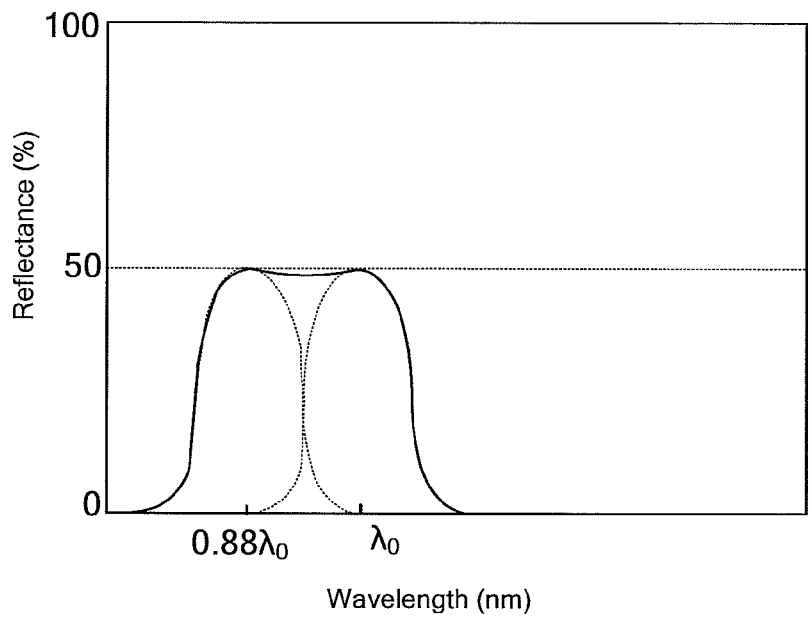
FIG. 7 is another graph showing the number of laminated cholesteric liquid crystal layers and reflection characteristics.

Likewise, a filter for the optical recording medium having the reflection property shown in FIG. 6 is obtained by laminating two cholesteric liquid crystal layers having different selective reflection center wavelengths and having the same rotation direction of the helix. FIG. 6 shows that the reflection property of the filter for a vertical incident light (0°) is 40% or more. By contrast, in the case of incident light from oblique directions, the reflection property peak shifts to shorter wavelengths as a light is incident from the oblique directions, and the reflection property is like that shown in FIG. 7 when a light is inclined at an angle of 20° in the liquid crystal layer.

As for a reflection region $\lambda_0$ to $1.3\lambda_0$ shown in FIG. 4, when $\lambda_0$ is 532 nm, $1.3\lambda_0$ is 692 nm. When the servo light has a wavelength of 655 nm, the servo light is reflected. The range of $\lambda_0$ to $1.3\lambda_0$ shown here is an adequacy for the ±40° incident light in the filter for the optical recording medium. When such largely inclined light is used, servo control can be performed without trouble by masking the servo light at an angle of incidence within ±20°. By sufficiently increasing the average refractive index of each of the cholesteric liquid crystal layers in the filter to be used, it is easy to design all the angles of incidence within ±200 in the filter for the optical recording medium. This can be achieved by laminating two cholesteric liquid crystal layers that show a wavelength range of $\lambda_0$ to $1.1\lambda_0$ shown in FIG. 6, and thus there is no trouble to transmit the servo light.

Therefore, from the results in FIGS. 4 to 7, even when the incidence wavelength is inclined at 0° to 20° (preferably 0° to 40°), the reflectance of 40% or more is assured in the filter for the optical recording medium of the present invention. Thus, the filter for the optical recording medium having no trouble in reading out signals is obtained.

The cholesteric liquid crystal layer is not particularly limited and may be appropriately selected depending on the purpose, as long as it satisfies the above properties. However, as described above, it contains the nematic liquid crystal compound and the chiral compound, further contains the polymerizable monomer, and still further contains other components, if necessary.

The cholesteric liquid crystal layer may be preferably two or more of the layers are laminated, and more preferably 4 to 10 layers. When the number of the laminated layers is less than 4, the selective reflection wavelength is shifted to shorter wavelengths as an incident angle increases, and thus the selective reflection of the predetermined wavelength may not be carried out. When the number of the laminated layers is more than 10, on the contrary, the production efficiency may be lowered and the object and effects of the present invention may not be accomplished.

As the cholesteric liquid crystal layer, those having circularly-polarized-light-separating property are preferred. The cholesteric liquid crystal layer having the circularly-polarized-light-separating property has the selective reflection property of reflecting only the light of a circularly polarized light component in which the rotation direction (clockwise or counterclockwise) of the helix in the liquid crystal is identical to a circularly polarized light direction, and the wavelength is a helical pitch of the liquid crystal. By utilizing the selective reflection property of the cholesteric liquid crystal layer, only the circularly polarized light having the specific wavelength is transmitted and separated from natural light in a certain wavelength band, and the remaining thereof is reflected.

Therefore, in the cholesteric liquid crystal layer, it is preferable that the first light is transmitted and the circularly polarized light of the second light which is different from the first light is reflected The first light preferably has a wavelength of 350 nm to 600 nm and the second light preferably has a wavelength of 600 nm to 900 nm.

—Nematic Liquid Crystal Compound—

The nematic liquid crystal compound is characterized in that liquid crystal phase thereof is stabilized at temperature equal to or lower than the liquid crystal transition temperature and may be appropriately selected from the liquid crystal compound, the high-molecular liquid crystal compound and a polymerizable liquid crystal compound having a refractive index anisotropy $\Delta n$ of 0.10 to 0.40 depending on the purpose. The nematic liquid crystal is aligned using an alignment substrate that has been subjected to an alignment treatment such as rubbing during a liquid crystal state upon melting, directly cooled for immobilization, and thereby used as a solid phase.

The nematic liquid crystal compound is not particularly limited and may be appropriately selected depending on the purpose, for example, the following compounds can be exemplified.

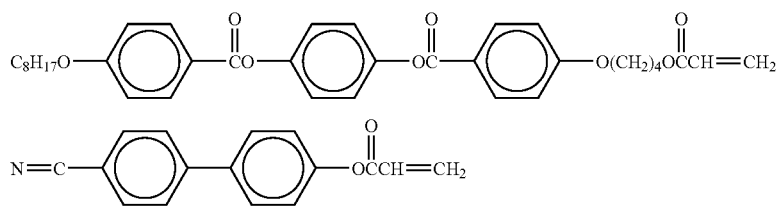

-continued
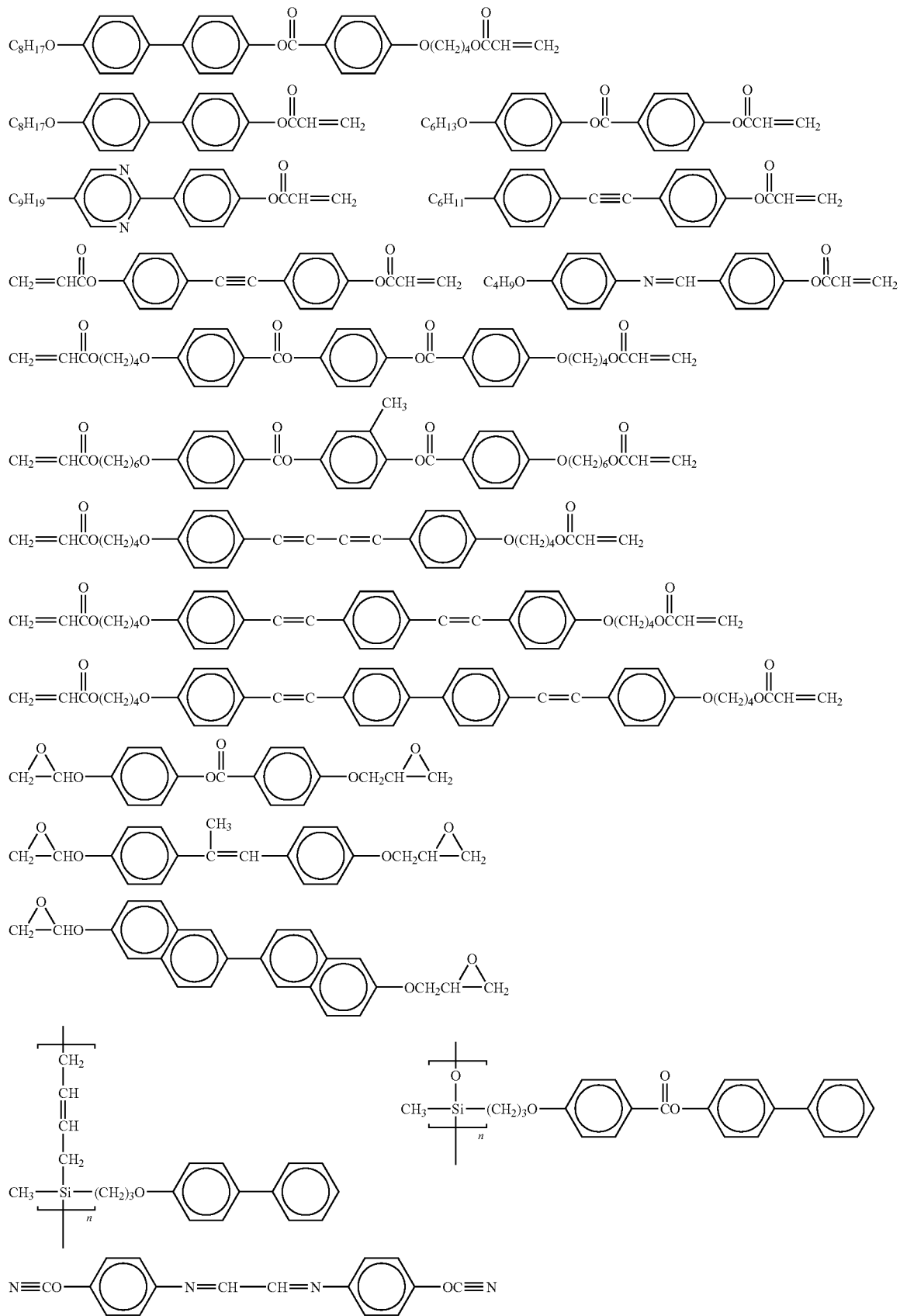

-continued

In the above formulas, n represents an integer of 1 to 1,000. Those obtained by changing the side chain linking group to the following structures in the above example compounds can also be preferably exemplified.

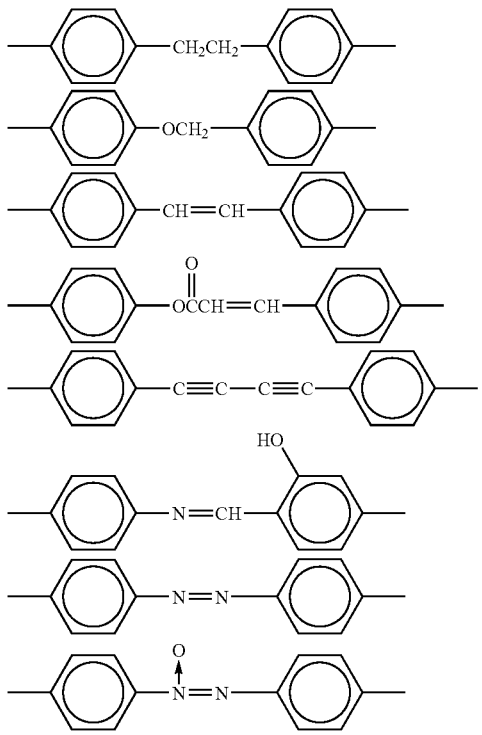

Among the above example compounds, as the nematic liquid crystal compound, the nematic liquid crystal compounds having a polymerizable group in the molecule are preferable in terms of assuring a sufficient curability. Of these, ultraviolet (UV) polymerizable liquid crystals are suitable. As the UV polymerizable liquid crystal, commercially available products can be used. Examples thereof include a trade name of PALIOCOLOR LC242 manufactured by BASF, a trade name of E7 manufactured by Merck, a trade name of LC-SILICON-CC3767 manufactured by Wacker-Chem, and trade names of L35, L42, L55, L59, L63, L79 and L83 manufactured by Takasago International Corporation.

The content of the nematic liquid crystal compound is preferably 30% by mass to 99% by mass and more preferably 50% by mass to 99% by mass on the basis of the total solid content mass in each of the cholesteric liquid crystal layers. When the content is less than 30% by mass, the alignment of the nematic liquid crystal compound is sometimes insufficient.

—Chiral Compound—

The chiral compound is not particularly limited and may be appropriately selected from those known in the art depending on the purpose. Examples thereof include an isomannide compound, catechin compound, isosorbide compound, fenchone compound and carvone compound, and additionally compounds expressed below, in terms of enhancing hue and color purity improvement of the liquid crystal compounds. These may be used alone or in combination of two or more.

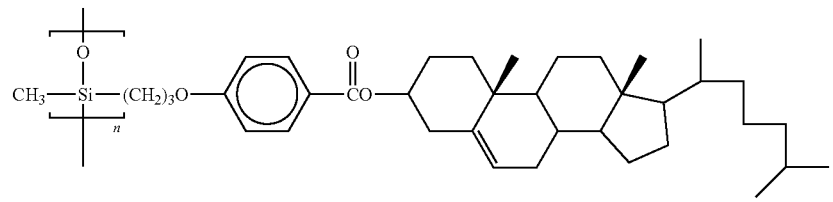

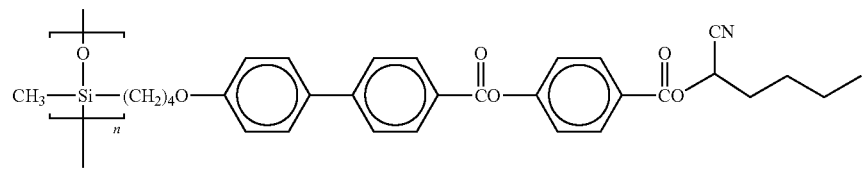

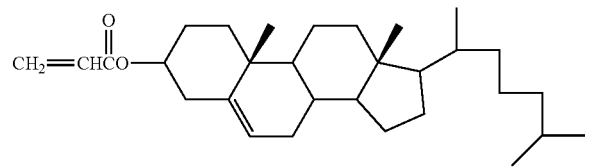
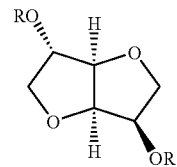

-continued

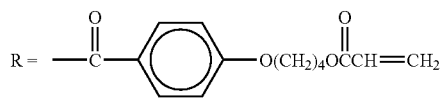

Left-handed helix

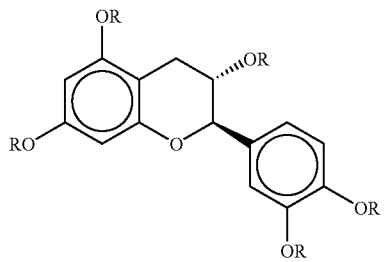

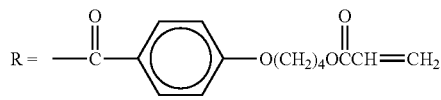

Left-handed helix

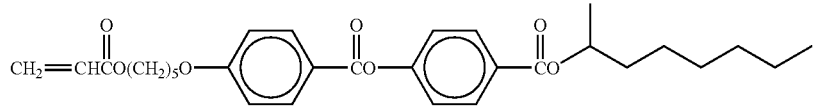

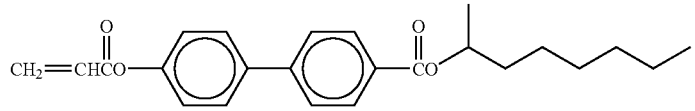

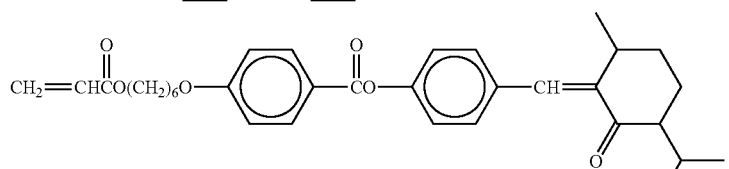

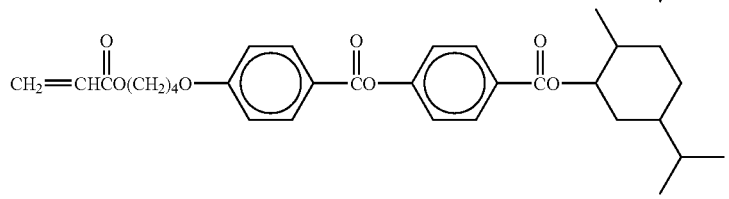

As the chiral compound, commercially available products can be used, and examples of the commercially available products include trade names of S101, R811 and CB15 manufactured by Merck, and a trade name of PALIOCOLOR LC756 manufactured by BASF.

The content of the chiral compound is preferably 0% by mass to 30% by mass and more preferably 0% by mass to 20% by mass on the basis of the total solid content mass in each of the cholesteric liquid crystal layers. When the content is more than 30% by mass, the alignment of the cholesteric liquid crystal layer may be insufficient.

—Polymerizable Monomer—

A polymerizable monomer can also be used in combination in the cholesteric liquid crystal layer for the purpose of enhancing the degree of cure such as film strength. When the polymerizable monomer is combined, the twist force of the liquid crystal due to light irradiation is changed (patterning) (e.g., the distribution of the selective reflection wavelengths is formed), subsequently, its helical structure (selective reflection property) is immobilized, and the strength of the cholesteric liquid crystal layer after being immobilized can be further enhanced. However, when the liquid crystal compound has a polymerizable group in the same molecule, the polymerizable monomer is not necessarily added therein.

The polymerizable monomer is not particularly limited and may be appropriately selected from those known in the art depending on the purpose. Examples thereof include monomers having an ethylenically unsaturated bond. Specifically, multifunctional monomers such as pentaerythritol tetraacrylate and dipentaerythritol hexaacrylate are exemplified.

Specific examples of the monomers having an ethylenically unsaturated bond include the compounds shown below. These may be used alone or in combination of two or more.

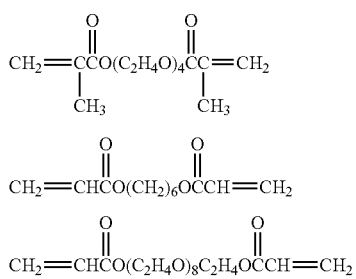

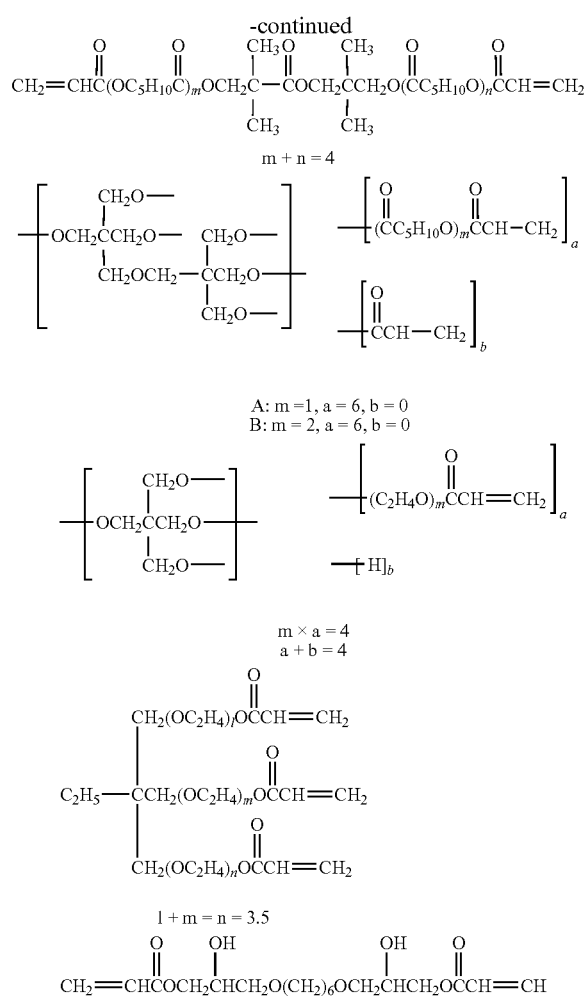

The content of the polymerizable monomer to be added is preferably 0% by mass to 50% by mass and more preferably 1% by mass to 20% by mass on the basis of the total solid content mass in each of the cholesteric liquid crystal layers. When the content is more than 50% by mass, the alignment of the cholesteric liquid crystal layer may be inhibited.

—Other Components—

The other components are not particularly limited and may be appropriately selected depending on the purpose. Examples thereof include a photopolymerizable initiator, sensitizer, binder resin, polymerization inhibitor, solvent, surfactant, thickener, dye, pigment, ultraviolet ray absorber and gelling agent.

The photopolymerizable initiator is not particularly limited and may be appropriately selected from those known in the art depending on the purpose. Examples thereof include p-methoxyphenyl-2,4-bis(trichloromethyl)-s-triazine, 2-(p-butoxystyryl)-5-trichloromethyl 1,3,4-oxadiazol, 9-phenylacridine, 9,10-dimethylbenzfenadine, benzophenone/Michler's ketone, hexaarylbiimidazole/mercaptobenzimidazole, benzyldimethylketal, and thioxanthone/amine. These may be used alone or in combination of two or more.

As the photopolymerizable initiator, commercially available products can be used, and examples of the commercially available products include IRGACURE 907, IRGACURE 369, IRGACURE 784 and IRGACURE 814 manufactured by Ciba Specialty Chemicals, and Lucilin TPO manufactured by BASF.

The content of the photopolymerizable initiator to be added is preferably 0.1% by mass to 20% by mass and more preferably 0.5% by mass to 5% by mass on the basis of the total solid content mass in each of the cholesteric liquid crystal layers. When the content is less than 0.1% by mass, it may take a long time because a curing efficiency upon light irradiation is low. When it exceeds 20% by mass, light transmittance in the ultraviolet ray region to a visible light region may be inferior.

The sensitizer is added to enhance the curing degree of the cholesteric liquid crystal layer, if necessary.

The sensitizer is not particularly limited and may be appropriately selected from those known in the art depending on the purpose. Examples thereof include diethyl thioxanthone and isopropyl thioxanthone.

The content of the sensitizer to be added is preferably 0.001% by mass to 1.0% by mass on the basis of the total solid content mass in each of the cholesteric liquid crystal layers.

The binder resin is not particularly limited and may be appropriately selected from those known in the art depending on the purpose. Examples thereof include polyvinyl alcohol; polystyrene compounds such as polystyrene and poly-α-methylstyrene; cellulose resins such as methylcellulose, ethylcellulose and cellulose acetate; acidic cellulose derivatives having carboxyl group in the side chain; acetal resins such as polyvinyl formal and polyvinyl butyral; methacrylic acid copolymers, acrylic acid copolymers, itaconic acid copolymers, crotonic acid copolymers, maleic acid copolymers, partially esterified maleic acid copolymers; homopolymers of alkyl acrylate ester or homopolymers of alkyl methacrylate ester; other polymers having hydroxyl group. These may be used alone or in combination of two or more.

Examples of the alkyl groups in the homopolymers of alkyl acrylate ester or the homopolymers of alkyl methacrylate ester include methyl, ethyl, n-propyl, n-butyl, isobutyl, n-hexyl, cyclohexyl and 2-ethylhexyl groups.

Examples of the other polymers having the hydroxyl group include copolymers of benzyl(meth)acrylate/(homopolymer of methacrylic acid) acrylic acid and polygenetic copolymers of benzyl(meth)acrylate/(meth)acrylic acid/another monomer.

The content of the binder resin to be added is preferably 0% by mass to 80% by mass and more preferably 0% by mass to 50% by mass on the basis of the total solid content mass in each of the cholesteric liquid crystal layers. When the content is more than 80% by mass, the alignment of the cholesteric liquid crystal layer may be insufficient.

The polymerization inhibitor is not particularly limited and may be appropriately selected depending on the purpose. Examples thereof include hydroquinone, hydroquinone monomethyl ether, phenothiazine, benzoquinone and derivatives thereof.

The content of the polymerization inhibitor to be added is preferably 0% by mass to 10% by mass and more preferably 100 ppm by mass to 1% by mass on the basis of the solid content of the polymerizable monomer.

The solvent is not particularly limited and may be appropriately selected from those known in the art depending on the purpose. Examples thereof include alkoxypropionate esters such as methyl 3-methoxypropionate ester, ethyl 3-methoxypropionate ester, propyl 3-methoxypropionate ester, methyl 3-ethoxypropionate ester, ethyl 3-ethoxypropionate ester and propyl 3-ethoxypropionate ester; esters of alkoxy alcohol such as 2-methoxypropyl acetate, 2-ethoxypropyl acetate and 3-methoxybutyl acetate; lactate esters such as methyl lactate and ethyl lactate; ketones such as methyl ethyl ketone, cyclohexanone and methyl cyclohexanone; γ-butylolactone, N-methylpyrrolidone, dimethyl sulfoxide, chloroform and tetrahydrofuran. These may be used alone or in combination of two or more.

<Base>

The shape, structure and size of the base are not particularly limited and may be appropriately selected depending on the purpose. Examples of the shapes include a flat plate and a sheet. The structure may be a monolayer structure or a laminated structure. The size may be appropriately selected depending on the size of the filter for the optical recording medium.

The materials of the base are not particularly limited and any of inorganic materials and organic materials may be suitably used.

Examples of the inorganic materials include glass, quartz and silicon.

Examples of the organic materials include acetate resins such as cellulose triacetate, polyester resins, polyether sulfone resins, polysulfone resins, polycarbonate resins, polyamide resins, polyimide resins, polyolefin resins, acryl resins, polynorbornene resins, cellulose resins, polyacrylate resins, polystyrene resins, polyvinyl alcohol resins, polyvinyl chloride resins, polyvinylidene chloride resins, and polyacryl resins. These may be used alone or in combination of two or more.

The base may be appropriately synthesized, or commercially available products may be used therefor.

The thickness of the base is not particularly limited and may be appropriately selected depending on the purpose. It is preferably 10 μm to 500 μm and more preferably 50 μm to 300 μm. When the thickness of the substrate is less than 10 μm, adhesiveness may be lowered due to flexibility of the substrate. Meanwhile, when it exceeds 500 μm, focus positions of the information light and the reference light must be shifted substantially, and thus the size of the optical system may be large inconveniently.

For the method for forming the filter for the optical recording medium, the filter can be suitably manufactured by the method for producing the optical recording medium described later, and for example, each of the cholesteric liquid crystal layers can be formed by applying on the base a coating liquid for each of the cholesteric liquid crystal layers, which is prepared using the above solvent, by means of a desired coating method.

As a technique that offers the best mass production aptitude, it is preferable that the base be prepared in a roll shape and the coating liquid for each of the cholesteric liquid crystal layers be applied on the base by a lengthy continuous coater such as a bar coater, a die coater, a blade coater, or a curtain coater.

The thickness of each of the cholesteric liquid crystal layers is preferably 1 μm to 10 μm and more preferably 2 μm to 7 μm. When the thickness is less than 1 μm, the selective reflectance may be insufficient. When it exceeds 10 μm, the uniform alignment of the liquid crystal layer may be disturbed.

The thickness (total thickness of each cholesteric liquid crystal layer except for the base) of the filter for the optical recording medium is, for example, preferably 1 μm to 30 μm and more preferably 3 μm to 10 μm.

The cholesteric liquid crystal layer is not particularly limited and may be appropriately selected depending on the purpose. The cholesteric liquid crystal layer is preferably formed by applying the coating liquid for each of the cholesteric liquid crystal layers on the base, being aligned and immobilized and punched out including the base into a disc shape, and then being disposed on the second substrate. The cholesteric liquid crystal layer may be directly disposed on the second substrate without the base when used for the filter layer of the optical recording medium.

The filter for the optical recording medium of the present invention may be used in various fields and suitably used for the formation or the production of the holographic optical recording medium, and for the following holographic optical recording medium and the method for producing the same, and the optical recording method and the optical reproducing method in the present invention.

—First Substrate—

The shape, structure and size of the first substrate are not particularly limited and may be appropriately selected depending on the purpose. Examples of the shapes include a disc shape and a card shape. It is necessary to select the material which can assure the mechanical strength of the optical recording medium. When the recording and reproduction lights pass through the substrate, the substrate is required to be sufficiently transparent in the wavelength range of the lights.

For the material of the first substrate, glass, ceramic and resin are generally used, and the resin is particularly suitable in terms of molding property and cost.

Examples of the resins include polycarbonate resins, acryl resins, epoxy resins, polystyrene resins, acrylonitrile-styrene copolymers, polyethylene resins, polypropylene resins, silicone resins, fluorine resins, ABS resins and urethane resins. Of these, the polycarbonate resins and the acryl resins are particularly preferable in terms of molding property, optical property and cost.

The first substrate may be appropriately synthesized or the commercially available products may be used therefor.

The thickness of the first substrate is not particularly limited and may be appropriately selected depending on the purpose. It is preferably 0.1 mm to 5 mm and more preferably 0.3 mm to 2 mm. When the thickness of the substrate is less than 0.1 mm, deformation of the shape during disc storage may not be suppressed. When it exceeds 5 mm, the weight of entire disc is large and excessive load may be imposed on the drive motor.

—Second Substrate—

The second substrate may be identical in shape, structure and size to the first substrate, or may be different. However, the second substrate preferably has the same shape and size as the first substrate.

In the second substrate, address-servo areas are provided at given angles to one another as a plurality of positioning areas linearly extending in the radial direction, and sectors between adjacent address-servo area serve as data areas. In the address-servo area, information for performing focus servo and tracking servo by a sampled servo system and address information have been recorded (pre-formatted) in advance in the form of emboss pits (servo pits). The focus servo can be performed using a reflection side of the reflective film. As the information for performing the tracking servo, for example, wobble pits can be used. When the optical recording medium has a card shape, the servo pit pattern is not necessary.

—Reflective Film—

The reflective film is formed on the surface of the servo pit pattern on the second substrate.

For the material of the reflective film, materials that offer high reflectance to a recording light and reference light are preferably used. When the wavelength of the light to be adopted is 400 nm to 780 nm, Al, Al alloys, Ag, Ag alloys and the like are preferably used. When the wavelength of the light to be adopted is 650 nm or more, Al, Al alloys, Ag, Ag alloys, Au, Cu alloys, TiN and the like are preferably used.

By using an optical recording medium which reflects a light by the reflective film and can write once or erase information—for example, DVD (Digital Video Disc), directory information indicative of the positions where information has been recorded, the time when information has been rewritten, and the positions where errors have occurred and how information has been rewritten in spare areas can also be written in and erased from the optical recording medium without adversely affecting holograms.

The formation of the reflective film is not particularly limited and may be appropriately selected depending on the purpose. Various vapor phase growth methods are used, for examples, a vacuum vapor deposition method, a sputtering method, a plasma CVD method, a light CVD method, an ion plating method, an electron beam vapor deposition method and the like. Of these, the sputtering is preferable in view of the production efficiency, and quality of the formed film.

The thickness of the reflective film is preferably 50 nm or more and more preferably 100 nm or more so as to realize the sufficient reflectance.

—Other Layers—

The other layers are not particularly limited and may be appropriately selected depending on the purpose. Examples thereof include a first gap layer and second gap layer.

—First Gap Layer—

The first gap layer is provided between the filter layer and the reflective film as needed for smoothing the surface of the second substrate. Moreover, the first gap layer is effective to adjust the size of the hologram formed in the recording layer. Specifically, since somewhat large regions where optical interference between a reference light for recording and information light takes place need to be secured in the recording layer, it is effective to provide a gap between the recording layer and the servo pit pattern.

The first gap layer can be formed by applying a material such as an ultraviolet curable resin over a servo pit pattern by spin coating and curing it. When the filter layer is coated on a transparent base, the transparent base also works as the first gap layer.

The thickness of the first gap layer is not particularly limited and may be appropriately selected depending on the purpose and is preferably 1 μm to 200 μm.

—Second Gap Layer—

The second gap layer is provided between the recording layer and the filter layer, if necessary.

The material of the second gap layer is not particularly limited and may be appropriately selected depending on the purpose. Examples thereof include transparent resin films such as cellulose triacetate (TAC), polycarbonate (PC), polyethylene terephthalate (PET), polystyrene (PS), polysulfone (PSF), polyvinyl alcohol (PVA) and polymethyl methacrylate (PMMA); and norbornene based resin films such as a trade name of ARTON film manufactured by JSR and a trade name of Zeonor manufactured by Zeon Corporation. Of these, those having a high isotropy are preferable, and TAC, PC, the trade name of ARTON and the trade name of Zeonor are particularly preferable.

The thickness of the second gap layer is not particularly limited and may be appropriately selected depending on the purpose and is preferably 1 μm to 200 μm.

Here, the optical recording medium of the present invention will be further described in detail below with reference to the drawings.

First Embodiment

Figure 8:
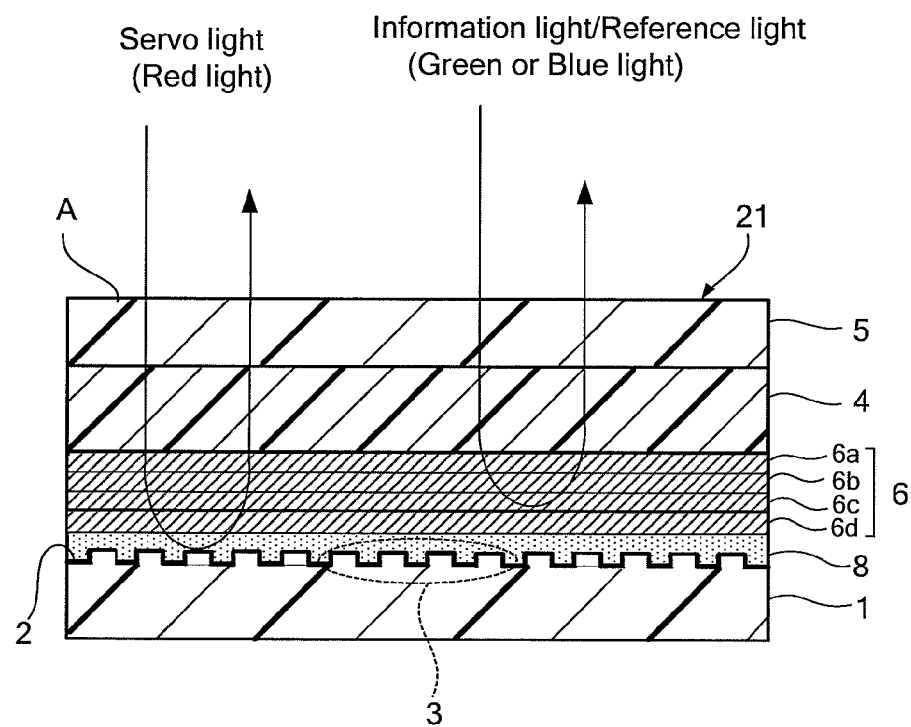
FIG. 8 is a schematic sectional view showing one example of the optical recording medium according to a first embodiment of the present invention.

FIG. 8 is a schematic sectional view showing the configuration of an optical recording medium 21 in a first embodiment of the present invention. In this optical recording medium 21 according to the first embodiment, a servo pit pattern 3 is formed on a substrate 1 made from a polycarbonate resin or a glass, and a reflective film 2 is formed by coating with aluminum, gold or platinum on the servo pit pattern 3. In FIG. 8, the servo pit pattern 3 is formed on the entire surface of the second substrate 1, the servo pit pattern may be formed periodically. The height of this servo pit is 1750 Å (175 nm) at a maximum, which is sufficiently small compared with the thickness of other layers including the substrate.

A first gap layer 8 is formed by coating the material such as an ultraviolet curable resin on the reflective film 2 formed on the second substrate 1 by spin coating. The first gap layer 8 is effective for protecting the reflective film 2 as well as adjusting the size of hologram generated in a recording layer 4. Specifically, since somewhat large regions where optical interference between a reference light for recording and information light takes place need to be secured in the recording layer 4, it is effective to provide a gap between the recording layer 4 and the servo pit pattern 3.

A filter layer 6 is disposed on the first gap layer 8, an recording layer is disposed on the filter layer 6, and the optical recording medium 21 is composed by sandwiching the first gap layer 8, the filter layer 6 and the recording layer 4 between a first substrate 5 (a polycarbonate resin substrate or glass substrate) and the second substrate 1.

In FIG. 8, the filter layer 6 transmits only a red light, and does not transmit other lights. Therefore, the information light and reference light for recording and reproducing are not transmitted through the filter layer 6, since they are a green or blue light, and never reach the reflective film 2, and then becomes a returning light to exit from the light entrance/exit surface A.

This filter layer 6 is a laminate in which four layers of cholesteric liquid crystal layers 6a, 6b, 6c and 6d are laminated. The filter layer 6 which is the laminate of the cholesteric liquid crystal layers may be formed directly on the first gap layer 8 by a coating method or may be provided by punching out the film in which the laminated four cholesteric liquid crystal layers have been formed on the base into the shape of the optical recording medium.

The optical recording medium 21 in the first embodiment may be a card shape or a disc shape. There is no need to provide a servo pit pattern in a case where the optical recording medium 21 is the card shape, the servo pit pattern is not indispensable. In the optical recording medium 21, the second substrate 1 is 0.6 mm-thick, the first gap layer 8 is 100 μm-thick, the filter layer 6 is 2 μm to 3 μm-thick, the recording layer 4 is 0.6 mm-thick and the first substrate 5 is 0.6 mm-thick, bringing to the total to about 1.9 mm-thick.

Next, optical operations around the optical recording medium 21 in the first embodiment will be described with reference to FIG. 10. First, the servo light (red light) emitted from the servo laser source is reflected at almost 100% at a dichroic mirror 13 and passes through an objective lens 12. The servo light is applied to the optical recording medium 21 so as to adjust a focus on the reflective film 2 by the objective lens 12. That is, the dichroic mirror 13 transmits the light of green or blue wavelength and reflects the light of red wavelength at almost 100%. The servo light incident from the light entrance/exit surface A of the optical recording medium 21 passes through the first substrate 5, the recording layer 4, the filter layer 6 and the first gap layer 8, is reflected in the reflective film 2, passes again through the first gap layer 8, the filter layer 6, the recording layer 4 and the first substrate 5, and exits from the entrance/exit surface A. The returning light, which has exited, passes through the objective lens 12, is reflected at almost 100% at the dichroic mirror 13, and servo information is detected by a servo information detector (not shown). The detected servo information is used for focus servo, tracking servo, slide servo and the like. The hologram material composing the recording layer 4 is designed so as not to be sensitive to red light. For this reason, even when the servo light has passed through the recording layer 4 or has been reflected diffusively by the reflective film 2, the recording layer 4 is not adversely affected. The returning light of the servo light that has been reflected by the reflective film 2 is reflected at almost 100% by the dichroic mirror 13. Thus, the servo light is not detected by CMOS sensor or CCD14 for detecting a reproduced image, and does not become noise for the reproduction light.

Both the information light and reference light for recording, derived from light beams emitted from the recording/reproduction laser source and modulated in a spatial light modulator 25, pass through a polarizing plate 16 so as to be linearly polarized. The linearly polarized lights then pass through a half mirror 17 and are circularly polarized after passing through a quarter wave plate 15. The circularly polarized lights then pass through the dichroic mirror 13 and the objective lens 12, and are applied onto the optical recording medium 21 in such a way that optical interference takes place between the information light and reference light for recording to create interference pattern in the recording layer 4. The information light and reference light for recording are incident from the light entrance/exit surface A and interfere with each other in the recording layer 4 to form an interference image therein. Thereafter, the information light and reference light for recording pass through the recording layer 4, and launching into the filter layer 6. There, before reaching the bottom of the filter layer 6, the lights are reflected and become the returning light. More specifically, the information light and reference light for recording do not reach the reflective film 2. This is because the filter layer 6 is composed of laminated four cholesteric liquid crystal layers, and has a property of transmitting only a red light. Moreover, as long as the intensity of light that has undesirably passed through the filter layer is suppressed to 20% or less of that of the incident light, there will be no practical problems even when such light reaches the bottom of the filter layer and is reflected back as the returning light, because this returning light is again reflected by the filter layer and its intensity in a reproduction light is as small as 4% (20%×20%) or less of that of the reproduction light.

—Fixing Recording—

The fixing light is applied to the recording layer 4 within 28 hours after recording of interference images for fixation of the record in the interference images.

Second Embodiment

Figure 3:
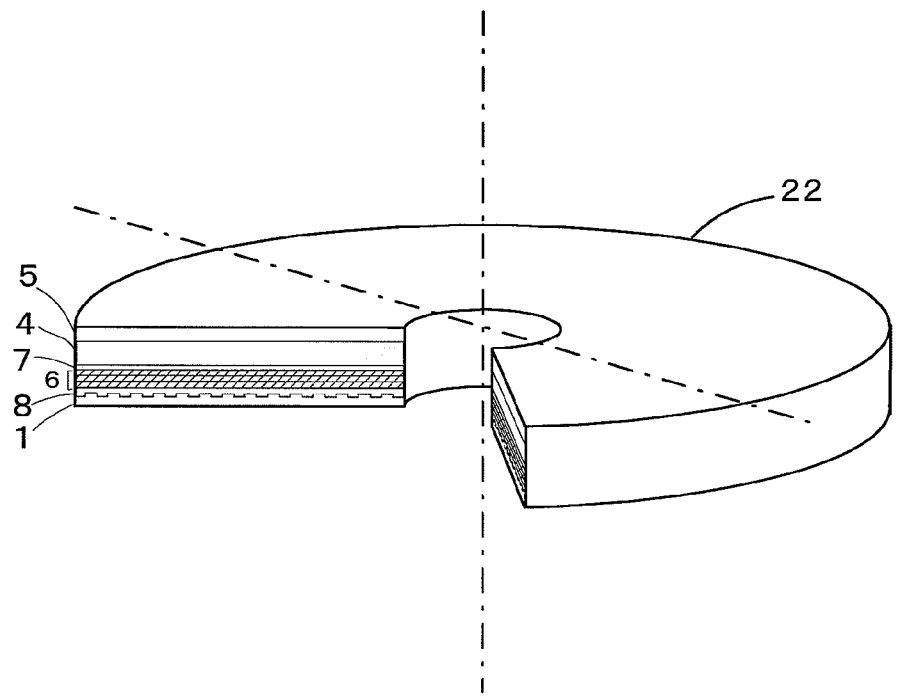
FIG. 3 is a schematic sectional view showing one example of a configuration of an optical recording medium.
Figure 9:
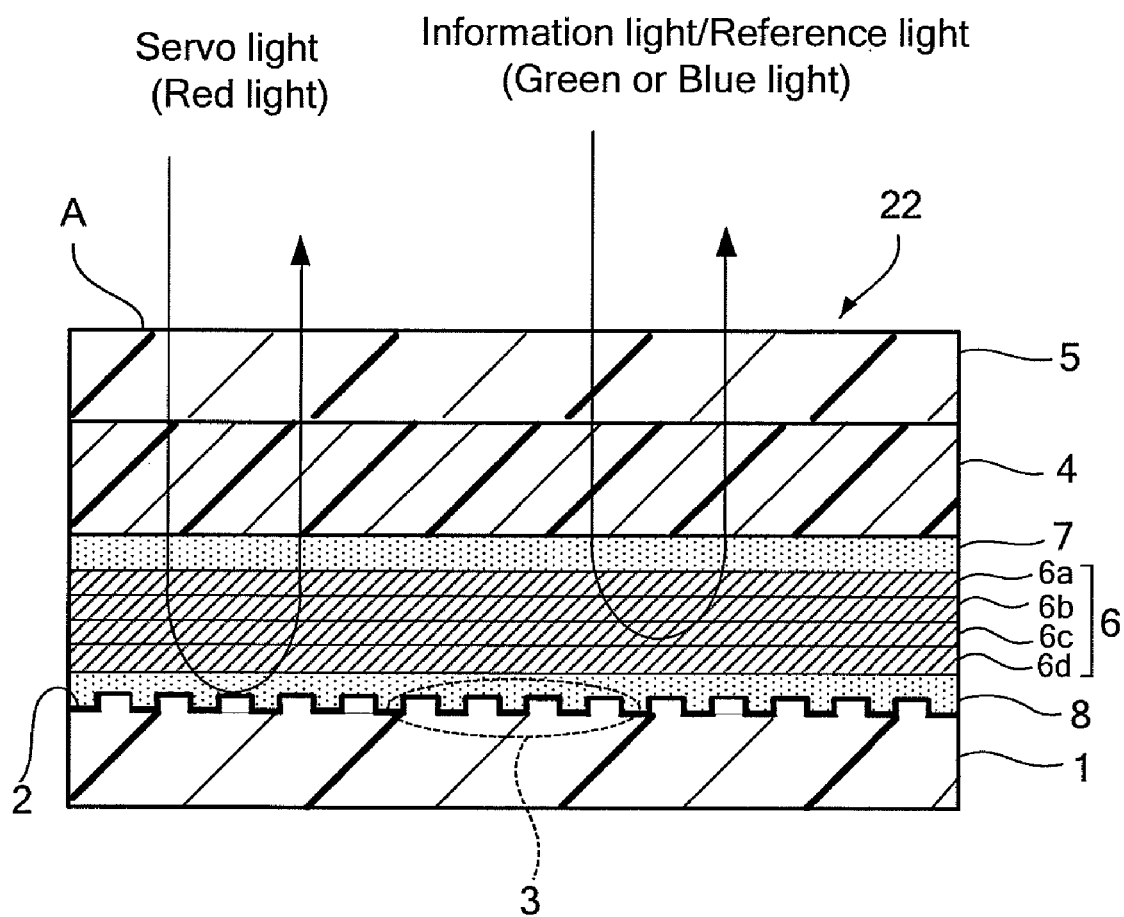
FIG. 9 is a schematic sectional view showing one example of the optical recording medium according to a second embodiment of the present invention.

FIG. 9 is a schematic view showing the configuration of an optical recording medium 22 in a second embodiment of the present invention. FIG. 3 is a perspective view showing the optical recording medium 22 which is partially cut and removed. The optical recording medium 22 has the same appearance configuration as the optical recording medium 21 shown in FIG. 9. In the optical recording medium 22 according to the second embodiment, a servo pit pattern 3 is formed on a substrate 1 made of polycarbonate resin or glass, and the serve pit pattern 3 is coated with A, Au, Pt or the like to form a reflective film 2. The height of the servo pit pattern 3 is generally 1750 Å (175 nm), as in the case of the first embodiment.

The second embodiment differs from first embodiment in that the optical recording medium 22 has a second gap layer 7 disposed between a filter layer 6 and a recording layer 4.

The filter layer 6 which is a laminate of four cholesteric liquid crystal layers is formed on a first gap layer 8 after the first gap layer 8 is formed, and the same filter layer as in the first embodiment can be used.

In the second gap layer 7 there is a point at which both the information light and reproduction light are focused; when this area is filled with photopolymer, excessive exposure takes place and thus an excess amount of monomers are consumed, leading to poor multiplexing recording performance. To avoid this, it is effective to provide a transparent and inert second gap layer.

In the optical recording medium 22a second substrate 1 is 1.0 mm-thick, the first gap layer 8 is 100 μm-thick, the filter layer 6 is 3 μm to 5 μm-thick, the second gap layer 7 is 70 μm-thick, the recording layer 4 is 0.6 mm-thick, and a first substrate 5 is 0.4 mm-thick, bringing to the total to about 2.2 mm.

Upon recording and reproducing information, the optical recording medium 22 having the structure described above is irradiated with a red servo light and a green information light and green reference light for recording and reproducing. The servo light is incident from the light entrance/exit surface A, passes through the first substrate 5, the recording layer 4, the second gap layer 7, the filter layer 6 and the first gap layer 8, and is reflected by the reflective film 2, and then becomes a returning light. This returning light sequentially passes through the first gap layer 8, the filter layer 6, the second gap layer 7, the recording layer 4 and the first substrate 5 again, and exits from the light entrance/exit surface A.

—Fixing Recording—

The recording is fixed in the same manner as in the first embodiment.

(Method for Producing Optical Recording Medium)

The method for producing an optical recording medium of the present invention is a method for producing the optical recording medium of the present invention, contains at least a filter layer forming step, and contains a reflective film forming step, a recording layer forming step, and further contains other steps, if necessary.

—Filter Layer Forming Step—

The filter layer forming step is a step of forming the filter layer composed of a laminate in which two or more cholesteric liquid crystal layers are laminated on the second substrate.

For the filter layer forming step, it is preferable, in terms of productivity, to form the filter layer by processing the filter for the optical recording medium of the present invention into a shape of the optical recording medium and bonding the processed filter to the second substrate.

The shape of the optical recording medium is not particularly limited and may be appropriately selected depending on the purpose. Examples thereof include a disc shape and a card shape.

The processing is not particularly limited and may be appropriately selected depending on the purpose. Examples thereof include a cutting out process by a press cutter, a punching out process by a punching cutter and a burning out process by a laser cutter.

Specifically, the filter is bonded to the substrate using an adhesive or a tackiness agent while avoiding inclusion of air bubbles.

The adhesive is not particularly limited and may be appropriately selected depending on the purpose. Examples thereof include a UV curable type, an emulsion type, a one liquid curable type and a two liquid curable type. The known adhesives may be used in combination, optionally.

The tackiness agent is not particularly limited and may be appropriately selected depending on the purpose. Examples thereof include a rubber based tackiness agent, acrylic based tackiness agent, silicone based tackiness agent, urethane based tackiness agent, vinyl alkyl ether based tackiness agent, polyvinyl alcohol based tackiness agent, polyvinyl pyrrolidone based tackiness agent, polyacrylamide based tackiness agent and cellulose based tackiness agent.

The method of laminating the cholesteric liquid crystal layers is not particularly limited and may be appropriately selected from known methods depending on the purpose, and examples thereof include (1) a method of laminating each of the cholesteric liquid crystal layers separately produced by the adhesive or the tackiness agent, (2) a method of laminating each of the cholesteric liquid crystal layers separately produced by thermal compression bonding, (3) a method of laminating each of the cholesteric liquid crystal layers separately produced by interfacial compatibility, (4) a method of laminating each of the cholesteric liquid crystal layers, in which a cholesteric liquid crystal layer is further coated on the formed cholesteric liquid crystal layer, and (5) a method of laminating each of the cholesteric liquid crystal layers, in which a cholesteric liquid crystal layer is further coated on the cholesteric liquid crystal layer formed on the transparent base. Of these, the coating method of (5) is preferable in terms of productivity and economical efficiency.

In the method of laminating (1), the adhesive and the tackiness agent are not particularly limited and may be appropriately selected depending on the purpose. Examples thereof include a UV curable adhesive and acryl based tackiness agent. The thickness of the coated adhesive or the tackiness agent is not particularly limited and may be appropriately selected depending on the purpose. In case of the adhesive, it is preferably 0.1 µm to 10 µm and more preferably 0.1 µm to 5 µm, and in case of the tackiness agent, it is preferably 1 to 50 µm and more preferably 2 µm to 30 µmin, in terms of optical property and thinning effect.

In the method of laminating (2), examples of the methods of thermal compression bonding include a heat sealing method, an ultrasonic method, an impulse sealing method and a high frequency joining method.

In the method of laminating (3), an example of the method for making compatible includes a method of coating a solvent which slightly dissolves and swells the cholesteric liquid crystal layer and integrating by interfacial compatibility.

Examples of the solvents which slightly dissolve and swell the cholesteric liquid crystal layer include aromatics such as toluene, benzene and xylene; alcohols such as methanol and ethanol; cyclic hydrocarbon such as cyclohexane and cyclopentane; ketones such as acetone and methyl ethyl ketone (MEK); ethers such as isopropyl ether; esters such as ethyl acetate; and a solvent of chlorines such as chloroform and dichloromethane. Of these, toluene, cyclohexane, cyclopentane, methyl ethyl ketone (MEK) and isopropyl alcohol are particularly preferable.

In the method of laminating (4), the coating method is not particularly limited and may be appropriately selected depending on the purpose. Examples thereof include an inkjet method, a spin coating method, a kneader coating method, a bar coating method, a die coating method, a blade coating method, a casting method, a dipping method and a curtain coating method.

The formation of the cholesteric liquid crystal layer by the above coating method can be suitably performed by using (coating and drying) a solution (coating liquid) in which the material of the cholesteric liquid crystal layer is dissolved.

A condition of further curing the coated film with ultraviolet ray as needed is not particularly limited and may be appropriately selected depending on the purpose. For example, the wavelength of the ultraviolet ray to be applied is preferably 160 nm to 380 nm, and more preferably 250 nm to 380 nm. The exposure time is preferably 10 seconds to 600 seconds and more preferably 10 seconds to 300 seconds when an exposure dose is 10 mW/cm$^2$. When the exposure dose is reduced to 1 mW/cm$^2$, generally, the content of a reaction initiator is increased. Thus, the exposure time is not so changed, and is preferably 10 seconds to 600 seconds and more preferably 10 seconds to 300 seconds.

In the method of laminating (5), as the material of the transparent base, any of inorganic materials and organic materials can be used. Examples of the inorganic materials include glass, quartz and silicon. Examples of the organic materials include acetate resins such as cellulose triacetate, polyester resins, polyether sulfone resins, polysulfone resins, polycarbonate resins, polyamide resins, polyimide resins, polyolefin resins, acryl resins, polynorbornene resins, cellulose resins, polyacrylate resins, polystyrene resins, polyvinyl alcohol resins, polyvinyl chloride resins, polyvinylidene chloride resins, and polyacryl resins. These may be used alone or in combination of two or more.

(Optical Reproducing Method)

In the optical reproducing method of the present invention, the reference light is applied to the interference image which is recorded in the recording layer 4 using the optical recording method of the present invention, so as to reproduce information. In order to apply the reference light to the interference image recorded in the recording layer 4, as shown in FIG. 10, the focus position of the reference light is set to where the interference image is recorded within the recording layer 4 by precisely controlling the objective lens 12, and then the reference light is applied. As a result of applying the reference light, diffracted light is generated from the interference image, and the diffracted light is passed through the objective lens 12, and further passed through the dichroic mirror 13, and a quarter wave plate 15. The transmitted light is reflected by a half mirror 17, and the information is reproduced from the diffracted light detected by a detector 14.

As described above, in the optical recording method and the optical reproducing method in the invention, information is recorded by superimposing the information light to which the two dimensional intensity distribution has been given on the reference light having nearly the same intensity as the information light inside the photosensitive recording layer and utilizing the interference image formed by them to generate the optical property distribution inside the recording layer. Meanwhile, when the written information is read out (reproduced), by applying only the reference light to the recording layer in the same arrangement as upon recording, the reproduction light having an intensity distribution corresponding to the optical property distribution formed inside the recording layer exits from the recording layer.

Here, the optical recording method and the optical reproducing method of the present invention are carried out using an optical recording and reproducing apparatus of the present invention described below.

The optical recording and reproducing apparatus used for the optical recording and reproducing method of the present invention will be described hereinafter.

Figure 11:
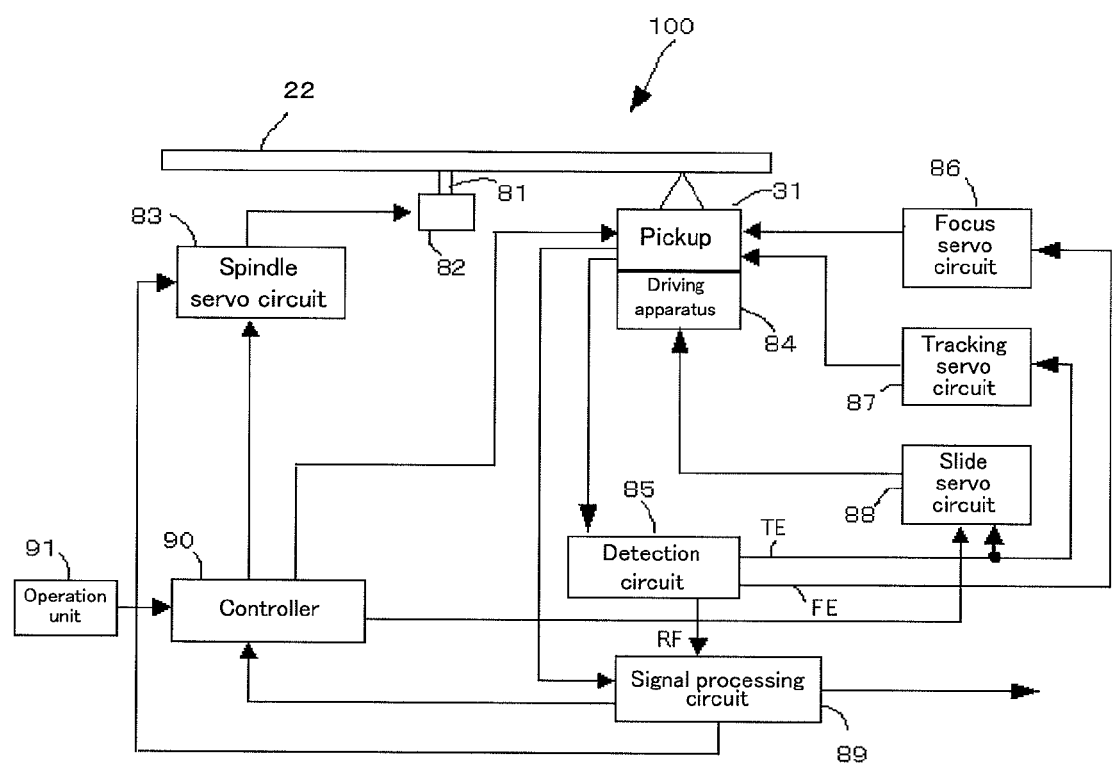
FIG. 11 is a block diagram showing one example of the entire structure of an optical recording and reproducing apparatus in the present invention.

FIG. 11 is a block diagram showing the entire configuration of the optical recording and reproducing apparatus related to one embodiment of the present invention. The optical recording and reproducing apparatus includes an optical recording apparatus and an optical reproducing apparatus.

This optical recording and reproducing apparatus 100 is equipped with a spindle 81 to which an optical recording medium 22 is attached, a spindle motor 82 which rotates the spindle 81 and a spindle servo circuit 83 which controls the spindle motor 82 in order to keep the rotational frequency of the optical recording medium 21 at a given value.

The optical recording and reproducing apparatus 100 is also equipped with a pickup 31 for recording information by applying an information light and a reference light for recording to the optical recording medium 22 as well as reproducing the information recorded in the optical recording medium 22 by applying a reference light for reproducing to the optical recording medium 22 to detect a reproduction light, and a driving apparatus 84 which enables this pickup 31 to move in the radius direction of the optical recording medium 22.

The optical recording and reproducing apparatus 100 is equipped with a detection circuit 85 for detecting a focus error signal FE, a tracking error signal TE and a reproduction signal RF by output signals from the pickup 31; a focus servo circuit 86 which performs focus servo by driving an actuator in the pickup 31 based on the focus error signal FE detected by this detection circuit 85 to move an objective lens (not shown) in the thickness direction of the optical recording medium 22; a tracking servo circuit 87 which performs tracking servo by driving the actuator in the pickup 31 based on the tracking error signal TE detected by the detection circuit 85 to move the objective lens in the radius direction of the optical recording medium 22; and a slide servo circuit 88 which performs slide servo by controlling the driving apparatus 84 based on the tracking error signal TE and a command from a controller described later to move the pickup 31 in the radius direction of the optical recording medium 22.

The optical recording and reproducing apparatus 100 is further equipped with a signal processing circuit 89 which reproduces data recorded in the data area in the optical recording medium 22 by decoding output data from CMOS or CCD array, which will be described later, in a pickup 31, reproduces a basic clock by reproduction signal RF from the detection circuit 85 and determines an address; a controller 90 which totally controls the optical recording and reproducing apparatus 100; and an operation unit 91 which gives various instructions to the controller 90.

The controller 90 inputs a basic clock and address information output from a signal processing circuit 89 as well as controls the pickup 31, the spindle servo circuit 83 and the slide servo circuit 88. The spindle servo circuit 83 inputs the basic clock output from the signal processing circuit 89. The controller 90 has CPU (central processing unit), ROM (read only memory) and RAM (random access memory), and CPU and runs programs stored in ROM to realize the functions of the controller 90 utilizing the RAM as a working area.

In the optical recording and reproducing apparatus used for the optical recording method and the optical reproducing method of the present invention, the optical recording medium of the present invention is used, so that diffuse reflection of the information light and the reference light from the reflective layer in the optical recording medium and occurrence of noise can be prevented, without causing shift in selective reflection wavelength, even when an angle of incidence is changed, and high density recording, which has not been conventionally achieved, can be achieved.

EXAMPLES

Examples of the present invention will be described below, however, the present invention is not limited in scope to these Examples at all.

Example 1

In order to perform an optical recording method of the present invention an optical recording medium was produced by preparing a filter for the optical recording medium and disposing it over a substrate.

—Preparing a Filter for Optical Recording Medium—

First, a base film was prepared by applying polyvinyl alcohol (a trade name of MP203 manufactured by Kuraray Co., Ltd.) so as to have a thickness of 1 μm on a polycarbonate film (a trade name of UPILON manufactured by Mitsubishi Gas Chemical Co., Inc.) having a thickness of 100 μm. A crystal alignment capability was imparted by passing the base film through a rubbing apparatus to rub the surface of the polyvinyl alcohol film.

Subsequently, coating liquids A, B and C for cholesteric liquid crystal layers having the composition shown in the Table 1 were prepared by a conventional method.

TABLE 1

| Component (part by mass) | Coating liquids for cholesteric liquid crystal layer | | |
| --- | --- | --- | --- |
| | A | B | C |
| UV polymerizable liquid crystal | 93.16 | 94.02 | 94.74 |
| Chiral agent | 6.84 | 5.98 | 5.26 |
| Photopolymerization initiator | 0.10 | 0.10 | 0.10 |
| Sensitizer | 0.02 | 0.02 | 0.02 |
| Solvent | 400 | 400 | 400 |

*UV polymerizable liquid crystal: a trade name of PALIOCOLOR LC242 manufactured by BASF
*Chiral agent: a trade name of PALIOCOLOR LC756 manufactured by BASF
*Photopolymerization initiator: a trade name of IRGACURE 369 manufactured by Ciba Specialty Chemicals K.K.
*Sensitizer: diethyl thioxanthone
*Solvent: methyl ethyl ketone (MEK)

Subsequently, the coating liquid A for the cholesteric liquid crystal layer was applied onto the base film using a bar coater, dried and then matured at 110° C. for 20 seconds for alignment. Then, the coated liquid A was exposed with irradiation energy of 500 mJ/cm² at 110° C. using an ultrahigh pressure mercury lamp to form a cured cholesteric liquid crystal layer A having a thickness of 2 μm.

Subsequently, the coating liquid B for the cholesteric liquid crystal layer was applied onto the cholesteric liquid crystal layer A using a bar coater, dried and then matured at 110° C. for 20 seconds for alignment. Then, the coated liquid B was exposed with irradiation energy of 500 mJ/cm² at 110° C.

using the ultrahigh pressure mercury lamp to form a cured cholesteric liquid crystal layer B having a thickness of 2 μm.

Subsequently, the coating liquid C for the cholesteric liquid crystal layer was applied onto the cholesteric liquid crystal layer B using a bar coater, dried and then matured at 110° C. for 20 seconds for alignment. Then, the coated liquid B was exposed with irradiation energy of 500 mJ/cm² at 110° C. using the ultrahigh pressure mercury lamp to form a cured cholesteric liquid crystal layer C having a thickness of 2 μm.

Thus, the filter for the optical recording medium of Example 1 was produced that has three layers having different selective reflection center wavelengths, a circularly-polarized-light-separating property, and the same clockwise rotation direction of helix.

—Production of Optical Recording Medium—

The optical recording medium having a first substrate, a second substrate, a recording layer and a filter layer were produced.

A commonly used substrate made from a polycarbonate resin having a diameter of 120 mm and a plate thickness of 0.6 mm used for DVD+RW was used as a second substrate. On the entire surface of this substrate, a servo pit pattern was formed, and the servo pit pattern had a track pitch of 0.74 μm, a groove depth of 175 nm and a groove width of 300 nm.

First, a reflective film was formed on the servo pit pattern surface formed on the second substrate. Aluminum (Al) was used for the material of the reflective film. The Al reflective film having a thickness of 200 nm was formed by a DC magnetron sputtering method. As a first gap layer a polycarbonate film having a thickness of 100 μm was bonded to the Al reflective film using an ultraviolet curable resin.

Subsequently, the filter for the optical recording medium produced in Example 1 was punched out into a given disc size so as to be disposed on the substrate, and the disc size filter was bonded to the substrate such that the base film surface thereof was made contact with the servo pit pattern of the substrate. The disc size filter was bonded to the substrate using an ultraviolet curable resin or a tackiness agent while avoiding inclusion of air bubbles. By the procedure described above, a filter layer was formed.

Subsequently, as a material of the recording layer, a photopolymer coating liquid having the following composition was prepared.

| - Composition of Photopolymer Coating Liquid - | |
|---|---|
| Di(urethane acrylate) oligomer (ALU-351 manufactured by Echo Resins) | 59 parts by mass |
| Isobornyl acrylate | 30 parts by mass |
| Vinyl benzoate | 10 parts by mass |
| Polymerization initiator (IRGACURE 784 manufactured by Ciba Specialty Chemicals) | 1 part by mass |

The obtained photopolymer coating liquid was placed on the filter layer using a dispenser.

The disc was bonded at its end to a first substrate having a diameter of 12 cm and a thickness of 0.6 mm made from a polycarbonate resin with an adhesive while pressing the first substrate on the photopolymer. The disc end was provided with a flange section so as to be the photopolymer layer having a thickness of 500 μm. The thickness of the photopolymer layer could be determined by bonding the first substrate to the disc end, and the excessively applied photopolymer overflowed and was removed. By the procedure described above, the optical recording medium of Example 1 was produced. FIG. 9 is a schematic sectional view showing an embodiment of a configuration similar to that in Example 1.

In Example 1, an optical recording medium was produced, in which ΔF, a difference between Fs and Fr (where Fs is a focal distance of the servo light and Fr is a focal distance between the information light and reference light (see FIG. 2)) is 100 μm, and a difference between the maximum and minimum values of ΔF is within ±10 μm.

<Controlling of Recording>

The obtained optical recording medium was set in an optical recording apparatus, and the information light and reference light each having a wavelength of 532 nm were applied on the optical recording medium with irradiation energy of 50 μJ/cm² for 100 ns. While the focus positions of the information light and reference light were detected by an astigmatism method, the focus positions were controlled by a servo mechanism in the optical recording apparatus.

On the basis of the result of the detected focus position, the focus position of the servo light having a wavelength of 650 nm in a thickness direction of the optical recording medium was controlled by the servo mechanism.

Moreover, the focus position in a track surface direction of the optical recording medium was detected by applying the servo light, and tracked by the servo mechanism in a way that the servo light was applied on the track.

<Recording on the Recording Layer>

Figure 10:
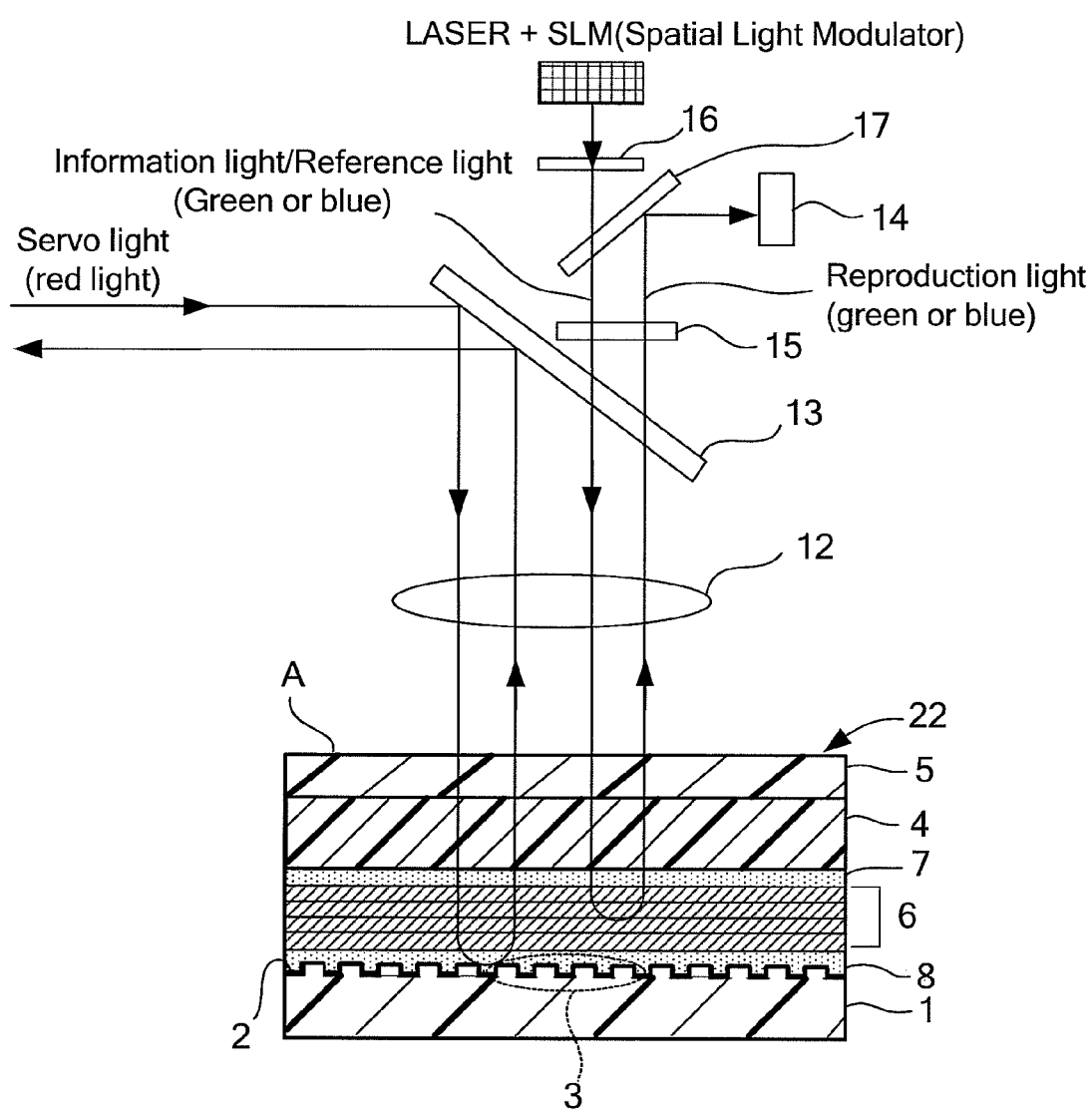
FIG. 10 is an illustrative view showing one example of an optical system around the optical recording medium of the present invention.

The recording on the recording layer was performed as shown in FIG. 10, by applying the information light and reference light for recording, each having the exposure energy of approximately 50 μJ/cm² to the recording layer for 100 ns to form an interference image, and recording the interference image on the recording layer.

—Selective Reflection Property of the Optical Recording Medium—

For each of the obtained optical recording medium, a light reflection property was measured using a spectrum reflection measurement apparatus (L-5662 manufactured by Hamamatsu Photonics K.K. as a light source and PMA-11 manufactured by Hamamatsu Photonics K.K. as a photo multichannel analyzer).

As shown in FIG. 10, as an information light or reference light, a laser beam having a wavelength of 532 nm was converted to a linearly polarized laser beam by the polarizing element 16, and was further converted to a clockwise circular polarized laser beam by the quarter wave plate 15. Such the converted laser beam was applied to the optical recording medium as the information or reference light, and a laser beam having a wavelength of 650 nm was applied to the optical recording medium as servo light. As a result, it was confirmed that the servo light was reflected by a reflective film 2.

Comparative Example 1

An optical recording medium of Comparative Example 1 was produced in the same matter as in Example 1, except that the difference between the maximum and minimum values of ΔF in Example 1 was set to be greater than 10 μm.

<Evaluation of Reproduction Quality of Recording>

The evaluation of the reproduction quality of the recorded information was performed by means of the optical recording and reproducing apparatus 100 shown in FIG. 11. In the evaluation, the reference light was applied to the optical recording medium so as to generate a diffracted light from the interference image, and the diffracted light was read by a detector 14 shown in FIG. 10 for reproduction of recorded information and measurement of error rates (spot/frame).

The error rates measured in Example 1 and Comparative Example 1 were 3 (spots/frame) and 30 (spots/frame), respectively.

INDUSTRIAL APPLICABILITY

The optical recording method of the present invention is capable of effective control of light irradiation position, such as focusing control or tracking control, at the time of recording or reproducing and of efficiently adjusting the light irradiation position control according to variations in distance between layers such as a recording layer in an optical recording medium or according to manufacturing errors in optical recording and reproducing apparatus; thus it is used as an excellent holographic optical recording method which can achieve improved recording efficiency for instance by increasing recording speed.

The optical recording medium of the present invention is capable of effective control of light irradiation position, such as focusing control or tracking control, at the time of recording or reproducing and of efficiently adjusting the light irradiation position control according to variations in distance between layers such as a recording layer therein or according to manufacturing errors in optical recording and reproducing apparatus; thus it is used as an excellent holographic optical recording medium which can achieve improved recording efficiency for instance by increasing recording speed.

The invention claimed is:

1. An optical recording method comprising:
    (i) applying at least one of an information light and a reference light to an optical recording medium for detection and control of focus positions of the information light and reference light in a thickness direction of the optical recording medium; and
    (ii) applying the information light and reference light so as to form an interference image to be recorded in a recording layer provided in the optical recording medium; and
    (iii) applying at least a servo light for detection of each of focus positions of the servo light in the thickness direction and a surface direction of the optical recording medium and for control of the focus positions of the servo light on the basis of information on the focus positions of the information light and reference light, the information detected in the step (i),
        wherein information is recorded in the recording layer by holography; and
    wherein a focal distance detected in the step (i) is defined as "Fr," and a focal distance in the thickness direction of the optical recording medium detected in the step (iii) is defined as "Fs" followed by detection of values for "Fr" and "Fs" at "n" positions, and a difference in focal distance (Fs−Fr) at each of the "n" positions is defined as "ΔF,"
    when a difference between maximum and minimum values of ΔF is within 10 μm, an average value of ΔF for the "n" positions (ΔFa) is calculated, and the servo light is applied so that a sum of the value of ΔFa and an average value of Fr at the "n" positions (Fra), ΔFa+Fra, is equal to a focal distance of the servo light in the thickness direction of the optical recording medium, to thereby omit detection and control of the focus position in the thickness direction of the optical recording medium in the step (iii), and
    when the difference between the maximum and minimum values of ΔF is more than 10 μm, detection and control of the focus position in the thickness direction of the optical recording medium in the step (iii) is conducted.

2. The optical recording method according to claim 1, wherein in the step (i), the focus positions are detected by at least one of an astigmatism method, a Foucault method, and a critical angle method.

3. The optical recording method according to claim 1, wherein in the step (iii), the focus position in the surface direction is detected by at least one of a three-beam method, a push-pull method, and a differential phase detection method.

4. The optical recording method according to claim 1, wherein the optical recording medium comprises, in order, a first substrate, the recording layer, a filter layer and a second substrate.

5. The optical recording method according to claim 1, wherein the optical recording medium is a reflective holographic recording medium.

6. The optical recording method according to claim 1, wherein the information light and reference light are applied in a manner that their optical axes are collinearly aligned.

7. An optical recording medium comprising information recorded by using the optical recording method according to claim 1.

8. An optical recording and reproducing method comprising reproducing recorded information corresponding to an interference image by applying a reference light to the interference image,
    wherein the interference image is formed in a recording layer using the optical recording method according to claim 1.

9. The optical recording and reproducing method according to claim 8, wherein the recorded information is reproduced by applying the reference light to the interference image at the same angle as an incident angle of the reference light applied at the time of recording information in the optical recording medium.

* * * * *